US012288570B1

(12) United States Patent
Lyle et al.

(10) Patent No.: US 12,288,570 B1
(45) Date of Patent: Apr. 29, 2025

(54) CONVERSATIONAL AI-ENCODED LANGUAGE FOR VIDEO NAVIGATION

(71) Applicant: NVIDIA Corporation, Santa Clara, CA (US)

(72) Inventors: Ruthie Lyle, Durham, NC (US); Somayyeh Rahimi, Del Mar, CA (US); Pratyush Mahapatra, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 18/049,446

(22) Filed: Oct. 25, 2022

(51) Int. Cl.
*G06F 3/0482* (2013.01)
*G06V 10/94* (2022.01)
*G06V 20/40* (2022.01)
*G11B 27/031* (2006.01)
*G11B 27/34* (2006.01)
*G06V 40/16* (2022.01)

(52) U.S. Cl.
CPC ............ *G11B 27/34* (2013.01); *G06F 3/0482* (2013.01); *G06V 10/945* (2022.01); *G06V 20/41* (2022.01); *G11B 27/031* (2013.01); *G06V 40/174* (2022.01)

(58) Field of Classification Search
CPC ...... G11B 27/34; G11B 27/031; G06V 20/41; G06V 10/945; G06V 40/174; G06F 3/0482
See application file for complete search history.

(56) References Cited

U.S. PATENT DOCUMENTS

| 9,609,277 | B1 | 3/2017 | Chen et al. | |
| 10,863,179 | B1* | 12/2020 | Nandakumar | H04N 19/436 |
| 11,580,737 | B1* | 2/2023 | Miller-Smith | G06V 20/70 |
| 2010/0162313 | A1* | 6/2010 | Ruiz-Velasco | H04N 21/23418 725/44 |
| 2011/0279638 | A1 | 11/2011 | Periyannan | |
| 2017/0134828 | A1* | 5/2017 | Krishnamurthy | H04N 21/47202 |
| 2017/0330029 | A1 | 11/2017 | Turcot | |
| 2018/0014022 | A1 | 1/2018 | Cho | |
| 2018/0098030 | A1 | 4/2018 | Morabia | |
| 2018/0367757 | A1 | 12/2018 | Faulkner | |
| 2019/0188479 | A1* | 6/2019 | Balasubramanian | G06T 7/251 |

(Continued)

OTHER PUBLICATIONS

Wang et al.; "One-Shot Free-View Neural Talking-Head Synthesis for Video Conferencing"; Available online at: <https://arxiv.org/pdf/2011.15126.pdf>; Apr. 2, 2021; 16 pages.

(Continued)

*Primary Examiner* — Stephen S Hong
*Assistant Examiner* — Darrin Hope
(74) *Attorney, Agent, or Firm* — Plumsea Law Group, LLC

(57) ABSTRACT

Systems and methods of compressing video content as encoded data and selectively reconstructing portions of the content are disclosed. The proposed systems provide a computer-implemented process configured to classify a person's behavior(s) during a video and encode the behaviors as a representation of the video. When playback of the video is requested, a video navigation assistant will allow the end-user to select specific segments of the video based on topics discussed in the video and the codes that were generated to represent the video. The user is then able to move through segments of the video in a sequence that aligns with their viewing preferences.

20 Claims, 11 Drawing Sheets

(56) References Cited

U.S. PATENT DOCUMENTS

| | | | |
|---|---|---|---|
| 2019/0230310 A1 | 7/2019 | Faulkner | |
| 2020/0074229 A1* | 3/2020 | AlShikh | G06F 40/30 |
| 2020/0186749 A1* | 6/2020 | Ai | G11B 31/006 |
| 2021/0329306 A1 | 10/2021 | Liu et al. | |
| 2022/0084273 A1* | 3/2022 | Pan | G06N 3/049 |
| 2022/0207262 A1 | 6/2022 | Jeong | |
| 2022/0308742 A1* | 9/2022 | Ziv | G06F 16/784 |
| 2022/0405316 A1* | 12/2022 | Raj | G06F 16/345 |
| 2022/0408056 A1 | 12/2022 | Zheng et al. | |
| 2023/0062704 A1 | 3/2023 | Rösner et al. | |

OTHER PUBLICATIONS

U.S. Appl. No. 17/382,027, filed Jul. 21, 2021.
U.S. Appl. No. 63/320,864, filed Mar. 17, 2022.
U.S. Appl. No. 18/045,915, filed Oct. 12, 2022.
U.S. Appl. No. 17/664,265, filed May 20, 2022.
U.S. Appl. No. 17/933,186, filed 2022/09/19.
Non-Final Office Action mailed Nov. 24, 2023 for U.S. Appl. No. 17/664,265.
Non-Final Office Action mailed Oct. 13, 2023 for U.S. Appl. No. 18/045,915.
Notice of Allowance Mailed on Aug. 7, 2024 for U.S. Appl. No. 17/933,186.
Notice of Allowance Mailed on Jul. 29, 2024 for U.S. Appl. No. 17/664,265.
Corrected Notice of Allowance mailed on Aug. 8, 2024 for U.S. Appl. No. 17/664,265.
Non Final Office Action Mailed on Aug. 22, 2024 for U.S. Appl. No. 18/045,915.
Final Office Action mailed Mar. 28, 2024 for U.S. Appl. No. 17/664,265.
Final Office Action mailed Apr. 5, 2024 for U.S. Appl. No. 18/045,915.
Non-Final Office Action mailed Apr. 11, 2024 for U.S. Appl. No. 17/933,186.

\* cited by examiner

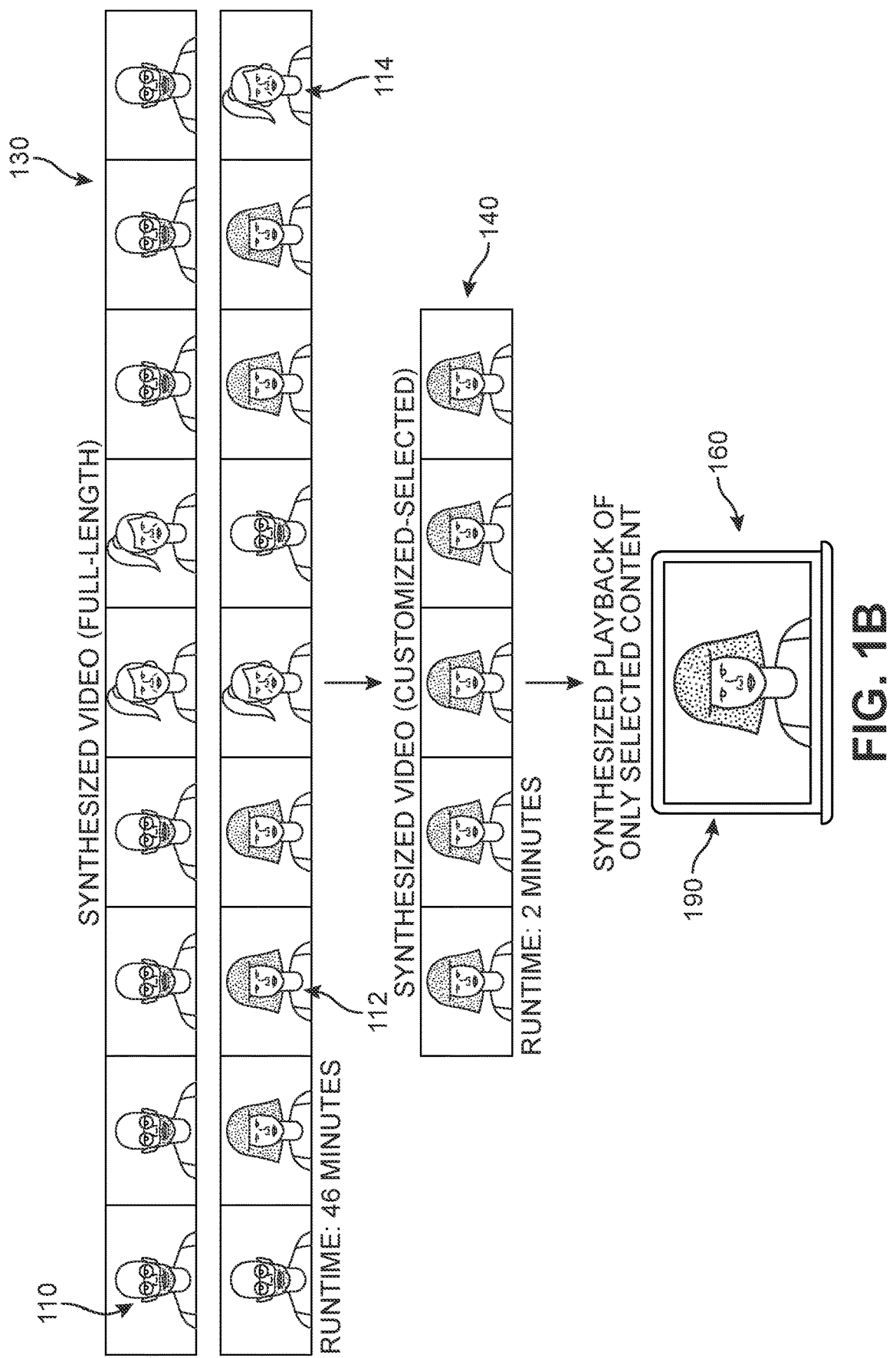

CONVERSATIONAL AI-ENCODED LANGUAGE FOR VIDEO NAVIGATION

TECHNICAL FIELD

The present disclosure generally relates to processing resources used to perform compression of video data, such as during video conferencing. At least one embodiment pertains to processors or computing systems used to record a reference image frame, and then reconstruct one or more video frames based on the reference image frame in response to a request for playback of a specific emotion or action (as indicated using a code) associated with the video frames.

BACKGROUND

While conventional video compression techniques can be effective at reducing the size of video bit streams, these techniques are typically computationally intensive. In addition, conventional compression codecs typically have struggled to keep up with the demand for greater video quality and resolution on memory-constrained devices, such as smartphones and other mobile devices, operating on limited-bandwidth networks. Furthermore, the storage requirements for these compressed (encoded) data continue to increase as video resolution increases and as users increasingly rely on video during conferences and other interactions. Finally, the ability of users to navigate through a video has remained time-dependent—in other words, users must scrub to manually move through the video timeline or search by time-based indices or manually-assigned chapters. Users interested in moving through a video based on parameters outside of these factors must scan and attempt to estimate where in the video their desired playback segment is located.

There is a need for video playback and navigation techniques that address the shortcomings described above.

SUMMARY

In one aspect, a computer-implemented method of navigating through video content is disclosed. The method includes an operation of receiving, at a video navigation system, an encoded video file representing a first video content, as well as a first transcript associated with the first video content. The method also includes an operation of automatically identifying, at the video navigation system and using a natural language model, including machine learning models, that is configured to process text and/or audio to determine, a plurality of topics discussed in the first transcript, and an operation of generating and presenting, via the video navigation system and at a first computing device, a user interface including a first list of topics based on the plurality of topics, each topic in the first list of topics corresponding to a selectable navigation option. In some embodiments, text analytics and text analysis machine learning models can do text analysis and a large language model (LLM) can do critical reasoning. In another example, the analysis could produce a list of topics. Using critical reasoning it could also automatically select all the clips that lead to a decision (which may not be based on topic, for example the model could detect how has most influence) in the session.

Another operation includes receiving, at the video navigation system and from a first user via the first computing device, a selection of a first topic from the first list of topics, and an operation includes selecting, at the video navigation system and in response to the selection of the first topic, a first sequence of encodings corresponding to one or more portions of the encoded video file that are associated with the first topic. Furthermore, the method includes an operation of generating, via a video synthesizer and based only on the first sequence of encodings, first synthesized video data, and an operation of initiating, via the video navigation system, a first playback session presenting the first synthesized video data.

In another aspect, another computer-implemented method of navigating through video content is disclosed. The method includes an operation of receiving, from a video data encoding system and at a video navigation system, a first encoded behavior file using a timestamped sequence of codes to represent facial expressions and poses of participants detected during first video content, an operation of receiving, from a first user via a first computing device and at the video navigation system, a selection of a first behavior that corresponds to a first code, and an operation of initiating, via the video navigation system, a first playback session presenting second video content that includes only those portions of the first video content associated with the first code.

In another aspect, a system is disclosed for navigating through video content. The system includes a processor and machine-readable media including instructions which, when executed by the processor, cause the processor to: (1) receive, at a video navigation system, an encoded video file representing a first video content; (2) receive, at the video navigation system, a first transcript associated with the first video content; (3) automatically identify, at the video navigation system and using a topic analysis machine learning model, a plurality of topics discussed in the first transcript; (4) generate and present, via the video navigation system and at a first computing device, a user interface including a first list of topics based on the plurality of topics, each topic in the first list of topics corresponding to a selectable navigation option; (5) receive, at the video navigation system and from a first user via the first computing device, a selection of a first topic from the first list of topics; (6) select, at the video navigation system and in response to the selection of the first topic, a first sequence of encodings corresponding to one or more portions of the encoded video file that are associated with the first topic; (7) generate, via a video synthesizer and based only on the first sequence of encodings, first synthesized video data; and (8) initiate, via the video navigation system, a first playback session presenting the first synthesized video data.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The methods and systems can be better understood with reference to the following drawings and description. The components in the figures are not necessarily to scale, emphasis instead being placed upon illustrating the principles of the methods and systems. Moreover, in the figures, like reference numerals designate corresponding parts throughout the different views.

FIGS. 1A and 1B depict an overview of an implementation of the video navigation system in which encoded video data is selectively synthesized based on a video participant code, according to an embodiment;

DESCRIPTION OF THE EMBODIMENTS

Figure 1A:
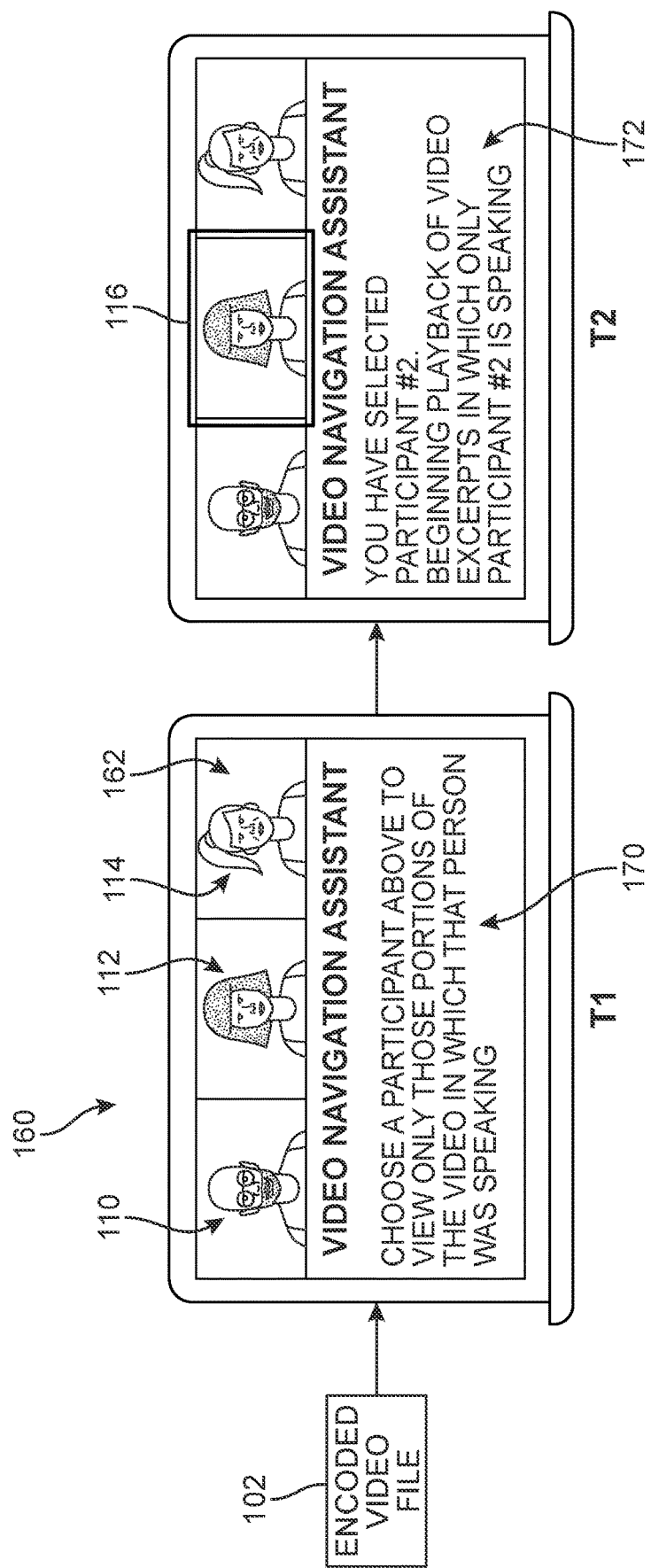

Digital video requires a significant amount of storage space or bandwidth in its original uncompressed form. Video coding or video compression is the process of compressing (encoding) and decompressing (decoding) video. Video compression makes it possible to transmit or store digital video in a smaller, compressed form. Many video compression standards, including MPEG-2, MPEG-4 and H.264, are well-known in the art today. However, while such standards are useful, the storage needed for conventionally encoded video data remains considerable. The generative adversarial network (GAN) framework has emerged as a powerful tool for various image and video synthesis tasks, allowing the synthesis of visual content in an unconditional or input-conditional manner. It has enabled the generation of high-resolution photorealistic images and videos, a task that was challenging or impossible with prior methods. It has also led to the creation of many new applications in content creation.

The proposed systems and methods take advantage of improvements in video synthesis to provide a video compression and navigation technique that is computationally efficient, and provides a substantial reduction in video size. As will be discussed in greater detail below, the proposed (real-time or offline) encoding process tracks and records the dynamic behaviors and audio for one or more participants in a video conference call or other video content using a series of codes. The codes, provided to what has been described as a "talking-head video synthesizer" or inference engine (see below), will reconstruct a simulated playback of the original video. Thus, the size of the file drops to reflect only the size of the original image used by the video synthesizer and a code document, leading to a significant reduction in bandwidth and vastly improved compression ratios than existing methodologies.

More specifically, the encoding process implemented by the disclosed data reduction system enables a navigation approach that significantly improves and expands the types of features that can be searched for in a video, and can reduce the amount of data that needs to be synthesized. In different embodiments, the proposed video navigation system is configured to support a "storyboard"-based navigation scheme that allows users to readily identify different segments of a video. In some embodiments, Natural Language Models using transcripts for an encoded video can be used to enable users to perform quick keyword or topic searches and/or to move directly to the desired/relevant part of the video by a participant's interaction behavior style or responses as captured by the video data encoding system. In one example, the keywords can represent specific words that were spoken someone in the video. In another embodiment an LLM can use at least one of codes associated with encoding and the video transcript and provide critical reasoning, for example identifying specific words spoken on a particular subject or determining which portions of the meeting influenced a decision. For example, the LLM model can determine that three clips related to a topic (types of laptops to be purchased) and that Jim influenced the decision towards intel based machines with 2 GB or RAM. In some embodiments where multiple speakers were captured in the video, the search can be limited to one or more selected speakers.

In further examples, searches can be based on even facial or pose characteristics that were encoded (e.g., which parts in the video evoked smiles or laughter from those whose faces are shown, when did a video participant raise their hand, etc.). For example, a machine model may automatically determine a facial expression or pose using at least one of codes associated with encoding and the transcript alone or in combination with synthesized video clips. In another example, users can request that sections where no one was speaking be at least one of auto-removed or accelerated in playback. In one embodiment, the video navigation system can use artificial intelligence (AI) techniques to perform non-linear editing of video segments in order to perform grouping of related topics. For example, although a chronological sequence of topics discussed in the video might be "A, B, C, D, and E", because D was closely related to topic A, the video navigation system can be configured to automatically reorganize the video presentation to follow the sequence of "A, D, B, C, and E".

In addition, it can be appreciated that in different embodiments the video navigation system can generate 'chapters' or sections in the video (e.g., inserting virtual bookmarks between segments of the video based on the content in the video) that reflect the end-user's desired partitioning settings and custom-create a navigation storyboard. For example, if the viewer is interested in segmenting the video into multiple chapters based on two or more selected keywords, the video navigation system can automatically consolidate the video frames associated with a first keyword into a first chapter, the video frames associated with a second keyword into a second chapter, and so forth. If the viewer is interested in segmenting the video by speaker, the video navigation system can automatically consolidate the video frames associated with a first speaker (i.e., all frames in which the first speaker is speaking) into a first chapter, the video frames associated with a second speaker (i.e., all frames in which the second speaker is speaking) into a second chapter, and so forth.

Once virtual bookmarks have been created as described, these items can be kept private to the user or shared with others.

In different embodiments, once these video slices or chapters have been identified and/or segments are organized, the video navigation system can include provisions for reducing load times. For example, the video navigation system can be configured to 'pre-load' or pre-synthesize (in the case of encoded video data) one or more frames for each of the chapters. In other words, for each section of the storyboard, the initial frames (entry points) of the chapter will be pre-generated and ready for immediate playback. Once the user selects a video chapter, there will be little to no wait time in the streaming playback or loading-related blockiness in the initial images because of this pre-loading feature.

As will be described in greater detail below, the proposed systems and methods offer a significant improvement over conventional video navigation tools. The encoding process described herein generates data representing a video that carries information that may be of great relevance to the viewer, including but not limited to facial expressions, emotions, hand gestures, tone, and other facets of human interaction that enable the use of a powerful user interface mechanism that can quickly guide a user from one key moment (as defined by the user) to another. The incorporation of transcript data further enables the user to search by keywords, or—following processing by a topic analysis module-broader topics in the video as detected by the video navigation system.

As a general matter, video synthesis focuses on generating video content that preserves the temporal consistency of the output videos. This is usually achieved by using a temporal discriminator, flow-warping loss on neighboring frames, smoothing the inputs before processing, or a post-processing operation. Conditional video synthesis generates videos conditioning on input content (e.g., future frame prediction, high-level representation input video, etc.). Some of the proposed embodiments can be understood to incorporate at least two major domains of conditional video synthesis: face reenactment and pose transfer.

Face reenactment usually starts by collecting footage of the target person to be synthesized. Some recently designed GAN frameworks only need a single 2D image of the target person (also referred to herein as a portrait or reference frame) and can synthesize talking videos of this person given arbitrary motions. These motions are represented using either facial landmarks or key points learned without supervision. Since the input is only a 2D image, many methods rely on warping the input or its extracted features and then fill in the un-occluded areas to refine the results. To synthesize the target identity, features are extracted from the source images and information is injected into the generator. Since these methods require only an image as input, they become particularly powerful and can be used in even more cases. Similarly, pose transfer techniques aim at transferring the body pose of one person to another person. It can be seen as the partial or whole body counterpart of face reenactment. Recent works have shown their capability to generate high quality and high-resolution videos for challenging poses.

More specifically, a pure neural rendering approach has been developed by which a talking-head video using a deep network in the one-shot setting is rendered without using a graphics model of the 3D human head. This type of approach can in some cases directly synthesize accessories present in the source image, including eyeglasses, hats, and scarves, without their 3D models. In different embodiments, the encoded behavior of video participants is reconstructed via a local free-view video synthesis model where one can freely change the viewpoint of the talking-head within a large neighborhood of the original viewpoint. The reconstruction model achieves this capability by representing a video using a novel 3D key point representation, where person-specific and motion-related information is decomposed. Both the key points and their decomposition are learned without supervision. Some examples of these techniques are described in further detail in U.S. Patent Publication No. 2021/0329306 published on Oct. 21, 2021 and titled "Video Compression using Neural Networks" to Ming-Yu Liu, et al. (hereinafter the Liu application), the disclosure of which is incorporated by reference in its entirety. The embodiments described herein apply these video synthesis techniques in order to facilitate the data compression and subsequent data presentation based on a digital avatar.

Thus, as original video content is received at the data reduction system, a behavior recognition model can review, in near-real-time, the facial expressions and gestures and other actions of a given participant (collectively referred to as behaviors). Each behavior can be detected and fall under a previously defined class or label. The behavior recognition model will classify the behaviors observed in a video stream, and an encoder will, based on the classification, produce a series of codes or symbols that represent the various changes in expression and pose of the participant over time. These timestamped encoded behaviors can be stored as a representation of the video data itself. When viewing of the video is desired, the compressed data is provided to a video synthesis module, also referred to herein as an inference engine. It is to be understood that the inference engine also receives audio data and/or transcription data which can be used in parallel with the outputted synthesized video in cases where the video includes speech or otherwise has sounds present in the video stream. In order to generate a synthetic video, the inference engine obtains or receives an initial reference frame (also referred to herein as a reference image or reference clip). With the reference frame and timestamped encoded behaviors, a simulated/synthesized video can be produced in which the person(s) shown does not remain unrealistically static, nor do they display random or inauthentic expressions. Instead, the simulated video presents the person engaging in their true-to-life behaviors, such as nodding, shaking their head, laughing, smiling, coughing, turning their face away, closing their eyes, resting their chin in their hand, etc., at or around the times that they actually exhibited such behavior when the video was captured.

As a general matter, the embodiments can be used with both live video streaming, as well as pre-recorded videos. As non-limiting examples, a video stream can be obtained during a video conferencing session in one example, between one or more senders and one or more receivers (collectively referred to as "participants"), or a YouTube®, Netflix®, or other video storing and/or streaming services-based video. In one embodiment, video streaming comprises video conferencing or teleconferencing. Thus, videos that are created in "real-time" (e.g., during a video conference application) as well as streaming videos can benefit from the proposed systems and methods. Similarly, two distinct video streams that are combined at a receiving device (e.g., "video within video" (e.g., a video "watch party" via a streaming service) can also be encoded and synthesized using the techniques described herein, where both video content and meeting content are encoded and synthesized simultaneously.

Video streaming comprises, in an embodiment, video game streaming and video game streaming services. In one embodiment, video streaming comprises digital satellite video streaming, such as digital satellite television streaming. In another embodiment video streaming comprises broadcast video streaming. Video streaming, in an embodiment, comprises internet video streaming. In one embodiment, video streaming comprises digital video broadcasting. Video streaming, in an embodiment, comprises any Advanced Televisions Systems Committee (ATSC) approved television or other video broadcast technique, such as cable or broadcast television. In another embodiment video streaming comprises any ATSC mobile/handheld (ATSC-M/H) video broadcast method. In one embodiment, video streaming comprises closed circuit television streaming and other closed circuit digital video capture or broadcast. In another embodiment video streaming comprises video capture and encoding performed by personal digital cameras, such as DSLR cameras, to store, encode, and transmit digital video data. In one embodiment, the proposed embodiments are usable for any video streaming and/or video capture application described above or further described herein. In other examples, a previously recorded video stored remotely can be encoded as described herein for a simplified and near-instantaneous "download" and playback of the video content at a local device.

For purposes of introduction, FIGS. 1A and 1B present an implementation where selection of a portion of a first video content is to occur. In FIG. 1A, encoded video file 102 is transmitted to a first computing device ("first device") 160. A video navigation user interface (UI) is accessed via first device 160, accessed locally or from a remote server. It should be understood that the encoded video file 102 includes data about the video, including which participant was speaking at what time. In this case, the UI includes a first interface 170 presented at a first time (T1) via a first display 162 of the first device 160 that is configured to offer a filtering mechanism to an end-user based on who is speaking in the video (e.g., "Video Navigation Assistant/ Choose a participant above to view only those portions of the video in which that person was speaking"). In some embodiments, the options shown can be identified as labels (e.g., Speaker 1, Speaker 2, etc.) or by speaker/participant names (if known). For purposes of this example, an image for each speaker is also shown, including a first speaker 110, a second speaker 112, and a third speaker 114. Once a selection is made at a first time (T1), the UI responds by presentation of a second interface 172 at a second time (T2) confirming a selection input 116 by the end-user and initiating playback (e.g., "Video Navigation Assistant/You have selected Participant #2. Beginning playback of video excerpts in which only Participant #2 is speaking") based on the user's selection.

In FIG. 1B, the encoded video content is synthesized. For purposes of comparison, a first video sequence 130 (represented by a sequence of 18 frame-segments) is shown above, a second video sequence 140 (represented by a sequence of five frame-segments) is shown below. The first video sequence 130 corresponds to what the synthesis of the full content of the video (based on the received encoded video data) would have been, and has a runtime of approximately 46 minutes. In contrast, the second video sequence 140 corresponds to only those segments of the video that included speech by the second speaker 112, with a total runtime of approximately 2 minutes. In other words, the user no longer needs to scrub through the full video to locate instances where their preferred participant is speaking. Instead, the system has automatically filtered the video based on the selection of the speaker. It is then this smaller selection that is synthesized and presented for playback 190 via first device 160, leading to a reduction in (a) video processing time, (b) user time expended searching for their desired content type, and (c) drain on battery and network resources.

As noted earlier, the options that can be offered by the video navigation system as well as its subsequent response is greatly facilitated by the encoding of the original video by the data reduction system. For purposes of this example, a first high-quality video approximately 46 minutes in length was converted by an encoding process to a set of codes or symbols to produce the encoded video file 102 (see FIG. 1A). The symbols stored in the encoded video file 102 are then used to generate synthesized videos that simulate the original video, here represented by the first video sequence 130 in FIG. 1B. As will be discussed in greater detail below, the video that will actually be synthesized (represented by the second video sequence 140) and shown to the viewer is further refined to align with the end-user's preferences.

The video navigation user interface for the assistant can offer a variety of options by which the encoded video file can be curated by the viewer. In this case, the end-user wished to view only those portions of the video in which the second speaker 112 was speaking. This selection led to the synthesis of an abbreviated version of the video (two minutes versus 46 minutes). In other examples, the end-user can request that only those portions of the video where a specific person was visible or present should be presented for playback, while the rest of the video that does not include this person remains un-synthesized. In other words, based on the selections made by the end-user, the video navigation system can dynamically and intelligently initiate the synthesis and playback of only some parts of the full video, while omitting synthesis of the remaining sections of the video.

Figure 2:
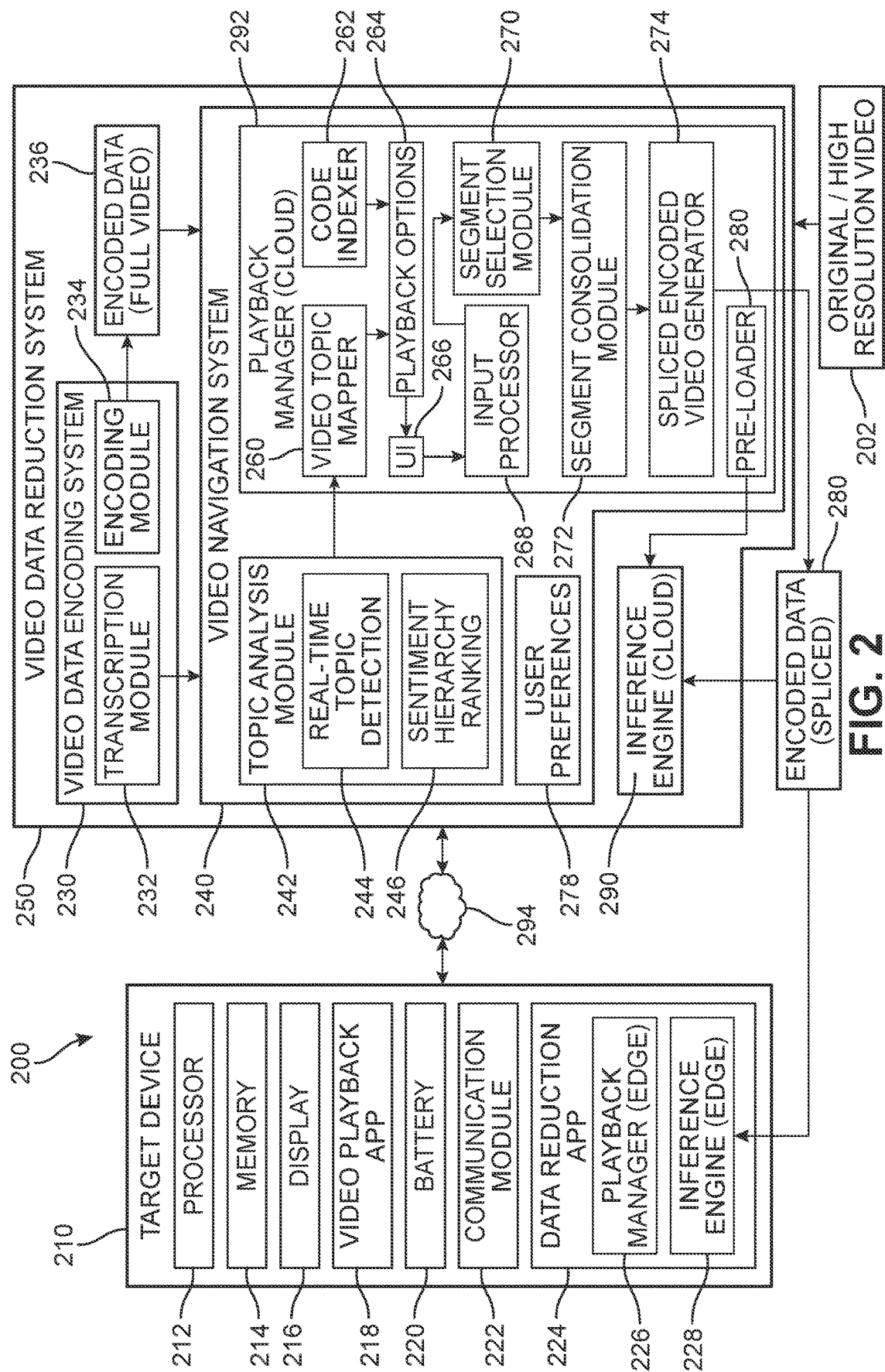
FIG. 2 depicts a schematic diagram of an environment including a system for video data reduction and navigation, according to an embodiment.

Referring now to FIG. 2, an environment 200 for implementation of a video data reduction system 250 is presented. In different embodiments, one or more components/modules of the video data reduction system 250 may be stored or otherwise reside locally on the user computing device, may be entirely stored in a cloud computing environment and then run on the local computing device, be mirrored across multiple user devices, or may include components residing on the local device and components residing in the cloud environment. For purposes of FIG. 2, the video data reduction system 250 can be understood to reside remotely in a server or cloud network environment. In some embodiments, one or more components of the video data reduction system 250 can be located in an offsite micro data center that associated with the user's cellular network. Thus, the encoding would happen nearer (but still remote relative to) the target device, and the final transmission of data to the target device would be relatively less costly.

As shown in FIG. 2, video data reduction system 250 includes a plurality of components and/or modules. When video content such as original video content 202 is received by video data reduction system 250, the data, including for example a sequence of image frames, can be analyzed by a video data encoding system 230. Additional details and context regarding the video data encoding system and process can be found in U.S. patent application Ser. No. 18/045,915, filed on Oct. 12, 2022 and titled "Selective Data Encoding and Machine Learning Video Synthesis for Content Streaming Systems and Applications" to Mahapatra, et al. (hereinafter the Mahapatra reference), the disclosure of which is incorporated by reference in its entirety for any and all purposes.

In different embodiments, the target device 210 can refer to a variety of computing device types, such as but not limited to a desktop computer, laptop, notebook, tablet, smartphone, smartwatch, etc. Each device can include an electronics unit comprising a plurality of different components, such as a user interface component (e.g., a touchscreen display, keyboard, mouse, microphone, speaker, etc.), a user interface module, a display 216, a processor 212, and/or a communication module 222. As used in this description, the term "module" is intended to include, but is not limited to, one or more computers, processing units, or devices configured to execute one or more software programs that include program code that causes a processing device(s) or unit(s) of the computer to execute one or more functions. The device may include a system including one or more processors 212 and memory 214. Memory 214 may comprise a non-transitory computer readable medium. Instructions stored within memory 214 may be executed by the one or more processors 212. The device may be configured to receive and analyze data from various input sensors associated with the device or data that is communicated from external components or devices connected to the device.

In addition, target device 210 includes communication module 222 that may allow the device to communicate, for example by enabling access to a wireless network 294; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In one embodiment, the target device 210 is configured to receive video data, for example during interaction with a videoconferencing application or a video service. For example, target device 210 can receive encoded video data and present this content using video streaming software and/or translation by an (optional) local or edge-based inference engine 224. In one embodiment, the video content that is then received is the encoded data comprising information usable to reconstruct or regenerate one or more images or video frames, where said information is generated, in part, by one or more devices and components of video data reduction system 250. In different embodiments, target device 210 can refer to a computing system or any other computing device comprising one or more video and audio components, such as display 216, battery 220, a video playback app 218, and a data reduction app 224 (with optional local or edge-based inference engine 228 serving as video decoder/synthesizer and optional local or edge-based playback manager 226. In some embodiments, the video playback app 218 functionality is included in the data reduction app 224, while in other embodiments, the features of the data reduction app 224 are implemented separately, preparing or processing the synthetic video before playback in the video playback app 218 is initiated.

User interfaces for APIs (application programming interfaces) such as the video playback app 218 or data reduction app 224 can be used to facilitate an end-user's interaction with, for example, a distributed computing environment (e.g., a web-based application), or an application residing wholly on a single computer system (e.g., a stand-alone application). In different embodiments, one or more of the computing devices can include device display ("display") 216 that can, for example, present information and media for a software application ("app"). In some embodiments, the app is associated with or is a platform providing the video data reduction service. In some cases, user devices may run client software through a web browser, in which case the client software may be hosted on a server associated with computer system. In other cases, user device may run client software in the form of a native software application that has been downloaded through a centralized marketplace (i.e., an "app store"). In some embodiments, the app can be otherwise downloaded to be accessible locally on the device or on another edge device. In some cases, while the client software that allows users to perform various tasks may be run on user device, some of the software data may be retrieved from and stored on databases associated with a remote server.

In some embodiments, the target device user can receive and send information through a user interface that may be presented on the device display 216, which may be associated with an app. In some embodiments, the display 216 may be a touchscreen, allowing the user to interact with the user interface directly by touch. The user interface may refer to an operating system user interface or the interface of one or more software applications that may run on the device. In some embodiments, the user interface can include a messaging window or other chat-space by which the local instance of may present messages or other digital content or the user may provide input. In addition, the app and/or a VoIP service can be configured to receive user voice inputs via an audio input device such as a microphone or other input devices such as a text-to-voice or gesture-to-voice device, and components to present audio outputs (authentic and/or synthesized voices) via audio output devices such as a speaker or headphones. In some embodiments, the display is an E-ink reader display (high resolution, with a very low frame rate), an infotainment display (low resolution and low frame rate), a smartwatch screen (small display with low resolution but a higher frame rate), or a tablet touchscreen, etc.

In some embodiments, the data reduction app 224 can offer a user settings and profile interface for accessing and modifying settings and viewing application activity. Selections made from the profile interface can include app-related user-specific information such as user settings, the user's selected video processing preferences, as well as an optional app activity history repository that can store and present to the user various data reflecting past app-based feedback or other responses. In some embodiments, the app can be configured to connect to the cloud (for example, via a Wi-Fi or cellular connection) to add or modify preference information for the user account that can also or alternatively be stored in the cloud, for example in a user account database (e.g., user preferences 278).

As a general matter, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "triggering", "actuation", "triggering event", or "actuation event" refers to an event (or specific sequence of events) associated with a particular input or use of an application via an interface, which can trigger a change in the display of the application.

Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. Voice control can also be used to actuate options. The term "asset" refers to content that may be presented in association with a native control in a native application. As some non-limiting examples, an asset may include text in an actuatable pop-up window, audio associated with the interactive click of a button or other native application object, video associated, or other such information presentation.

As shown in FIG. 2, the video data reduction system 250 includes a video navigation system 240, which further includes or has access to the user preferences 278, a playback manager 292, and a topic analysis module 242. The operation of each of these components will be discussed below.

In different embodiments, the data reduction app 224 can receive selections from a user that will be stored as user preferences 278 that can affect the operations performed by the video navigation system 240. Preferences can, for example, determine how many frames should be included in a segment that has been selected by the user (i.e., how many frames or runtime of video should precede the frame that includes the requested characteristic, and/or how many frames or runtime of video should come after the frame), how speakers should be identified (i.e., identify a person as a speaker if their contribution was above a selected percent of all of the words spoken over the entire video vs any person who produced an audio input for the video), whether the selected video segments (also referred to herein as video snippets, slices, or chapters) should be ordered chronologically, by runtime, by topic, etc., which will affect the activity and operation of the video data encoding system 230. In other embodiments, for example in cases where the user does not select any preferences, default settings will be applied in the performance of the video navigation system 240.

In one embodiment, the video data reduction system 250 comprises one or more parallel processing units (PPUs), such as graphics processing units (GPUs). In another embodiment, the video data reduction system 250 accelerates or otherwise improves inferencing performance of one or more neural networks using one or more PPUs, such as GPUs. In one embodiment, the video data reduction system 250 utilizes one or more PPUs, such as GPUs, for any other purpose related to services provided to one or more clients by said video data reduction system 250. As one example, a GPU for neural network training and a processor for inference can be employed. For example, when original video content 202 is received by the video data reduction system 250, video data reduction system 250 converts original video content to video frames or other data using one or more neural networks. In some embodiments, the video data encoding system 230 receives the original video content 202 and performs further processing via an encoding module 234 and a transcription module 232.

In different embodiments, video data for one or more participants in a video can be encoded based on the behaviors exhibited by each participant during the video. As discussed in greater detail in the Mahapatra reference, in different embodiments, a behavior recognition module associated with the encoding system 230 can include one or more models configured to detect and label specific human behaviors such as facial expressions, changes in pose, and gestures. As a general matter, facial expressions are the facial changes in response to a person's internal emotional states, intentions or social communications. From a computer vision point of view, facial expression analysis refers to computer systems that attempt to automatically analyze and recognize facial motions and facial feature changes from images. Facial expression analysis includes both measurement of facial motion and recognition of expression. The general approach to automatic facial expression analysis (AFEA) consists of three operations: face acquisition, facial data extraction and representation, and facial expression recognition. A participant expression model can be configured to extract and represent the facial changes caused by facial expressions. In facial feature extraction for expression analysis, there are mainly two types of approaches: geometric feature-based methods and appearance-based methods.

Depending on the different facial feature extraction methods, the effects of in-plane head rotation and different scales of the faces can be removed by face normalization before the feature extraction or by feature representation before the operation of expression recognition. Facial expression recognition is the last stage of AFEA systems. The facial changes can be identified as facial action units (AUs) or prototypic emotional expressions. In some embodiments, the participant expression model can make use of the facial action coding system (FACS), which consists of 44 facial AUs, which are codes that describe certain facial configurations, and/or emotion recognition algorithms. Thirty AUs are anatomically related to contraction of a specific set of facial muscles. It can be appreciated that the production of a facial action has a temporal evolution, which plays an important role by interpreting emotional displays. The temporal evolution of an expression is typically modeled with four temporal segments: neutral, onset, apex and offset. Neutral is the expressionless phase with no signs of muscular activity. Onset denotes the period during which muscular contraction begins and increases in intensity. Apex is a plateau where the intensity usually reaches a stable level, whereas offset is the phase of muscular action relaxation. The participant expression model 252 incorporates machine learning techniques.

In some embodiments, the behavior recognition module can also be configured to detect and classify poses, which include human gestures and changes in body position. For example, behavior recognition module can include or otherwise have access to a participant pose model. The pose model is configured to evaluate image data to determine whether a gesture or change in body position has occurred. As a general matter, gesture can be understood to refer to the use of motions of the limbs or body as a means of expression, to communicate an intention or feeling. The majority of hand gestures produced by speakers are meaningfully connected to speech. These communicative hand movements have been defined along a "gesture Kendon's Continuum" as five different kinds of gestures including (1) Gesticulation: spontaneous movements of the hands and arms that accompany speech; (2) Language-like gestures: gesticulation is integrated into a spoken utterance, replacing a particular spoken word or phrase; (3) Pantomimes: gestures that depict objects or actions, with or without accompanying speech; (4) Emblems: familiar gestures such as "V for victory", "thumbs up", and assorted rude gestures (often culturally specific); and (5) Sign languages: Linguistic systems, such as American Sign Language, which are well defined.

It can be appreciated that some gestures have both static and dynamic elements, where the pose is important in one or more of the gesture phases; this is particularly relevant in sign languages. When gestures are produced continuously, each gesture is affected by the gesture that precedes it, and possibly, by the gesture that follows it. There are several aspects of a gesture, which may be relevant and therefore may need to be represented explicitly in computer vision systems. The pose model can be configured to identify and classify each of these types of gestures. For example, in one embodiment, four aspects of a gesture can be determined by the pose model: (a) Spatial information—where it occurs, locations a gesture refers to; (b) Pathic information—the path which a gesture takes; (c) Symbolic information—the sign that a gesture makes; and (d) Affective information—the emotional quality of a gesture. The classification assigned to a sequence of image frames can include multiple subclassifications that describe some or all of these aspects. Static gesture or pose recognition can be accomplished using template matching, geometric feature classification, neural networks (NNs), or other standard pattern recognition techniques to classify pose. Dynamic gesture recognition, however, requires consideration of temporal events, and the pose model in determining whether a specific type of gesture is occurring will also take into account the timing of each change in pose. This can, for example, be accomplished by using techniques such as time-compressing templates, dynamic time warping, hidden Markov models (HMMs) and/or Bayesian networks.

In some embodiments, the pose model and expression model can be components of a single machine learning model (referred to as a behavior model), and together produce a unified output. The training of the models can be based at least in part on annotated video files, where the annotation can be manually added and/or prepared via AI (artificial intelligence) assisted annotation. For example, once training video data is received, AI-assisted annotation may be used to aid in generating annotations corresponding to imaging data to be used as ground truth data for the behavior recognition module's models. In one embodiment, AI-assisted annotation may include one or more machine learning models (e.g., convolutional neural networks (CNNs)) that may be trained to generate annotations corresponding to certain types of imaging data. in some embodiments, AI-assisted annotations may then be used directly, or may be adjusted or fine-tuned using an annotation tool (e.g., by a participant, developer, or other end-user), to generate ground truth data. In another embodiment labeled video data may be used as ground truth data for training a machine learning model. In one embodiment, AI-assisted annotations, labeled video data, or a combination thereof may be used as ground truth data for training a machine learning model. In different embodiments, the training data can vary based on regional, cultural, and other behavioral differences associated with the original video content. In another embodiment one or more of behavior machine learning models may already be trained and ready for deployment at the local device.

In different embodiments, a behavior recognition model can review, in near-real-time, the facial expressions and gestures and other actions of a given participant (collectively referred to as the participant's behaviors). Each behavior can be detected and fall under a previously defined class or label. The behavior recognition model can classify the behaviors observed in a video stream, and an encoder can, based on the classification, produce a series of codes that represent the various changes in expression and pose of the participant over time. These timestamped encoded behaviors can be stored as a representation of the video data itself. When viewing of the video is desired, the compressed data is provided to a video synthesis module or inference engine, as discussed below.

In some embodiments, behavior recognition model(s) can be trained to detect common actions or expressions produced by non-speaking participants in videoconferences using previously recorded and annotated conference calls. In some embodiments, a behavior model can be further tested by being fed simulated video output from the inference engine (video synthesizer) and determining whether the simulated video largely matches the original video content. If there are more discrepancies than desired, the behavior model will continue to be trained and refined with additional annotated training data until the simulated video output more closely aligns with the original video stream.

In some embodiments, dynamic classifications (a term used interchangeably with the term "labels" herein) assigned to the image frames after being processed by the behavior recognition module will be time-stamped or otherwise include a sequence of frames that are associated with said label. Thus, for example, a label can be assigned to video data for times T1, T2, T3, and/or the same label can be assigned to (for example) a sequence of Frames 6 to 30 to ensure the correct portion of video includes the appropriate behavior classification for each person participating in the video content. In some embodiments, a feature database can provide categorical descriptors and characteristics that will be available for application by the behavior recognition module. In some embodiments, a particular video segment will be assigned one dynamic classification (e.g., "laughing"). In another embodiment, the same video segment can be assigned multiple dynamic classifications (e.g., "laughing", "shaking head") and/or subclassifications ("grinning", "dimples", "mouth open wide", "shaking head fast/slow", etc.). These dynamic classifications can in some cases differ in response to instructions provided via the user's encoding preferences. In an exemplary embodiment, a video segment may comprise a plurality of image frames, and the frames collectively will be classified under a single label or set of labels. Thus, a "sneeze" classification may refer to a video segment of 24 frames, while a "yawn" classification may refer to a video segment of 48 frames. In another example, the labels can be based on time intervals, such that a "sneeze" classification may refer to a video segment of two or three seconds, while the "yawn" classification is for a video segment extending across 4-10 seconds. In some embodiments, a dynamic classification attached to a segment of video automatically isolates that portion of video so that no other classifications can overlap with the segment.

In different embodiments, the timestamped classifications outputted from the behavior recognition module are received by encoding module 234. The encoding module 234 is configured to exchange each classified video segment for one or more preset codes. The code(s) that is used to 'replace' the video segment depends on the label that was assigned to the video segment describing the participant's expression and/or pose. As some non-limiting examples, a first video segment of approximately four seconds can be assigned a "nodding" label, a second video segment of approximately nine seconds can be assigned a "sipping-from-cup" and "eyes-closed" label, a third video segment of approximately twenty seconds can be assigned a "grinning" label, "shaking-head" label, and "raising-arms-in-the-air" label, and a fourth video segment of approximately two seconds can be assigned a "thumbs-up"; in some cases, an additional sub-label (secondary label) "right-hand" can be added for greater discrimination. Once the encoding module 234 generates and outputs full encoded data 236 (representing the full video of original video content 202), the full encoded data 236 can be conveyed to and received by the video navigation system 240, as discussed further below.

In some alternate embodiments, the video data encoding system 230 can also implement a different coding scheme whereby simple videos (e.g., only or primarily comprising of a person's face speaking into the camera) can be converted into a sequence of emojis or other symbols that will represent the facial expression of the person at that time via a symbol encoder module. An example of this approach would allow for a first person speaking to be encoded as a first "speaker" emoji, the same person laughing being encoded as a second "laughter" emoji, the same first person smiling as a third "smile" emoji, etc. The stream or sequence of emojis will be timecoded and used by the decoder/inference engine to determine how the avatar (reference image) should appear during the playback at each time. If there is a second (or more) person in the video, they would also be assigned a sequence of emojis that would 'stand in' for the actual video content and be later used to synthesize the video. This approach, as well as other encoding techniques, are further discussed in the Mahapatra reference.

In addition to the encoding process and output by encoding module 234, in different embodiments, the encoding system 230 can include or have access to transcription module 232. For example, embodiments of the proposed systems and methods may make use of various techniques and technologies, such as but not limited to speech processing, speech synthesis, and Natural Language Processing (NLP) systems. As a general matter, speech processing is a technology that allows computing devices to recognize— and, to some extent, understand—spoken language. Typically, one or both of two types of software products may be implemented: continuous-speech recognition software products and command-and-control software products. In addition, speech synthesis is a process that provides the ability to mimic speech. Because it is increasingly important that the synthesized output sounds are pleasant and sound human enough to encourage regular use, the associated software products offer highly effective and accurate conversational generation and mimicry. Similarly, NLP systems are systems that are configured to interpret written, rather than spoken, language and may be found in speech processing systems that begin by converting spoken input into text. Using lexicons and grammar rules, NLP parses sentences, determines underlying meanings, and retrieves or constructs responses.

Thus, in some embodiments, audio data for the original video content is processed by a natural language processor (NLP) associated with transcription module 232 in order to automatically generate transcription of the audio using, for example, via a speech-to-text processor or other ASR (automatic speech recognition) techniques and extract various other information pertaining to pre-selected parameters. In some other embodiments, a featurizer may initially deidentify data and process and convert the data to consumable features. As a general matter, NLP techniques may be used to process sample speech data as well as to interpret the language, for example by parsing sentences, and determining underlying meanings of the words. Embodiments can make use of any techniques already known in the field of natural language processing (NLP). These include any techniques in speech recognition and natural language understanding.

As one non-limiting example, the system can include the computing resources to conduct natural language processing (NLP) on received speech audio files. For example, the NLP applied by the system may include machine translation of the received speech audio files to obtain a translation of the speech captured by the received speech audio files into written text. The machine translated text may then be analyzed according to one or more NLP analyses such as text summarization and/or sentiment analysis. The NLP analyses may comprise implementing sentence breaking rules on the machine translated text to break up the text into smaller chunks of text such as paragraphs and individual sentences. The NLP analyses may further comprise tagging parts of speech identifiers (e.g., noun, verb, article, adjective) to the words that comprise a chunk of text. The NLP analyses may further comprise parsing the text to create one or more parsing tree that outline different possible interpretations for a chunk of text. The NLP analyses may further comprise terminology extraction that extracts one or more key terms from a chunk of text to better understand the context of the text. The NLP analyses may further comprise language translation capabilities to translate text from one language to another. In different embodiments, aspects such as prosody, accent, language type, dialect, speed, pronunciation, etc. may be assessed and classified.

In some embodiments, voice recordings can include recordings in various data formats including, but not limited to, MP3, WAV, AIFF, FLAC, OGG, and ACC files. Generally, audio is recorded using an audio codec. The processed signal is conveyed to the NLP which is configured to use acoustic models and language models to statistically analyze the sound recording and identify likely words. For example, the speech recognition component of the NLP may take the digital or analog audio signal from the call and performs speech recognition analysis to recognize one or more words spoken. Speech recognition (also referred to as automatic speech recognition (ASR), computer speech recognition or voice recognition) technology generally represents a set of technologies that allows computers equipped with a source of sound input, such as a microphone, to transform human speech into a sequence of words recorded in a computer data file. Some examples of these include the use of Hidden Markov Models (HMMs), dynamic algorithms, neural network-based models, and knowledge-based approaches. Certain systems can recognize natural human speech which has the property of words "sticking together" (or coarticulated together), also referred to as continuous speech (continuous speech recognition). Other speech recognition systems and technologies may be applicable as well. In some embodiments, the speech recognition component can make use of statistical language models (SLMs) and statistical semantic models (SSMs) that determine what a speaker means in addition to the words they said. In some embodiments, the speech recognition component generates transcription and speech characteristics via transcription module 232 of the voice sample. The transcript outputted by transcription module 232 can then be conveyed to and received by the video navigation system 240.

In general, traditional or conventional transcripts typically do not identify listeners, and instead only show the participant's presence when they verbally contribute. However, as described in the Mahapatra reference, in order to represent the coding that is applied to all of the video's members, each participant's portion is depicted, regardless of whether or not they are speaking. In some cases, their status can be "(Muted)", reflecting their lack of audio. As a simple example, a code "{P1:T1:0001}" can be generated for a particular video segment and person, with elements corresponding to the participant's identity (P1), the time (T1), and the behavior (0001). While, for purposes of simplicity, the speaker remains "the speaker" and the participants remain "the listeners" in this example, it should be understood that there may be multiple instances in which each listener becomes a speaker, and the speaker becomes a listener. During these types of exchanges, the system will encode the change in speaker source, which will allow the output of the synthesized video to accommodate the audio output for the new speaker, while also accurately rendering the behavior of the speaker-turned-listener.

Figure 3:
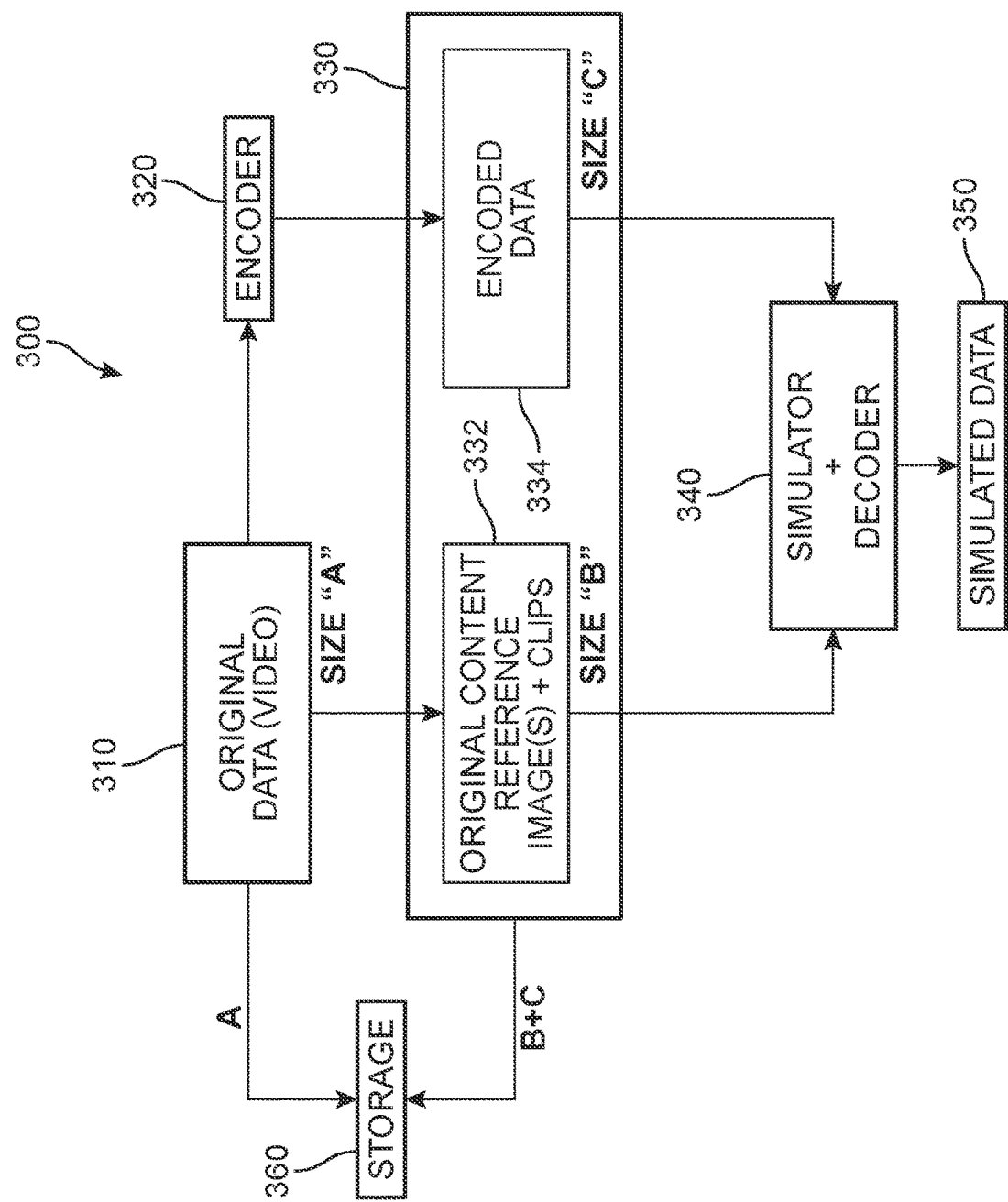
FIG. 3 is a schematic flow diagram depicting a process of storing data for an original video and the video's compressed version, according to an embodiment.

For purposes of clarity, an overview of the process described herein with respect to the encoding process and subsequent reconstruction is presented in a flow diagram 300 of FIG. 3. In this high-level schematic, original video data ("original data") 310 can be stored in storage 360. Original data has a first file size "A". When the original data 310 is processed by embodiments of the video data encoding system, an encoder 320 can replace some, most, or nearly all of the video with a sequence of codes (encoded data 334). Encoded data has a second file size "B". In addition, preserved original content 332 in the form of reference image(s) and clips for unclassified content will be preserved. Preserved original content 332 has a third file size C. Collectively, compressed video data 330 will have a file size of "B+C". As a general matter, the file size "A" as compared to the file size "B+C" is significantly larger, and will typically be hundreds to thousands time greater in size. Nevertheless, when the compressed video data 330 is provided to the video synthesizer ("simulator") and its associated decoder 340, the outputted simulated data 350 can carry the bulk of the information that had been captured as original data 310.

Figure 4:
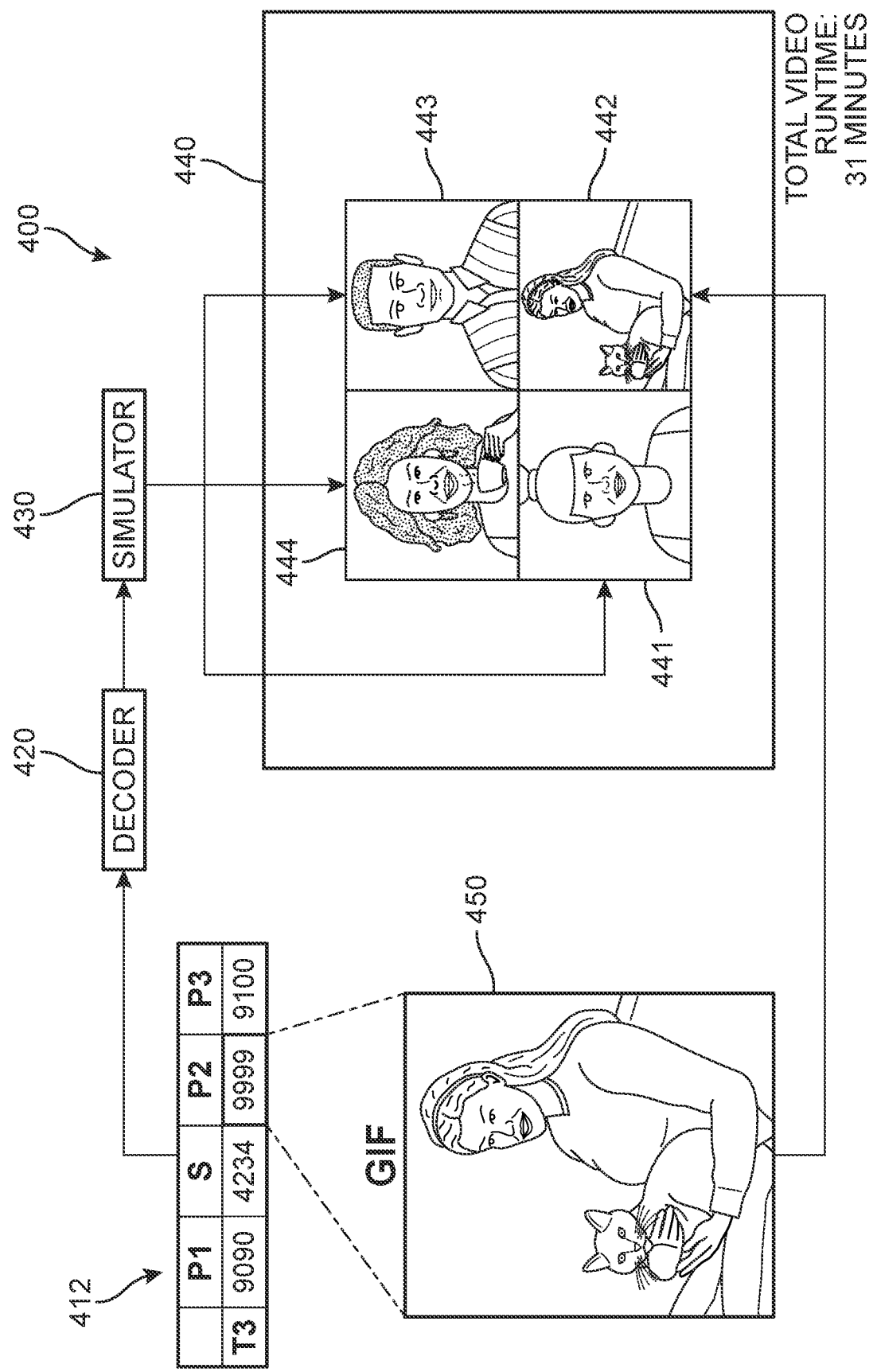
FIG. 4 is a schematic flow diagram showing one example of a process for generating a simulation via a video synthesizer (inference engine), according to an embodiment.

An embodiment of the reconstructed output is illustrated in a schematic diagram 400 in FIG. 4. For purposes of this example, at a third time "T3" in the video, the participants had each changed pose or expression, and a second participant (P2) 420 had engaged in an unrecognized behavior. This is represented by code excerpt 412 in FIG. 4. A decoder 420 translates each of the recognized behaviors that were coded, and when playback is requested, the decoded file is sent to simulator 430, which generates a reconstruction of the image frames associated with third time T3 for a first participant (P1) 410, a speaker(S) 440, and a third participant (P3) 430. However, with respect to the second participant 420, a GIF 450 was clipped and stored, and is now inserted into the video data to provide an accurate representation of the second participant 420, because of the unrecognized behavior code that was assigned (9999). In this case, the original video had a runtime of 31 minutes, and the resultant synthesized video generated based on the encoded file is also 31 minutes.

Returning now to FIG. 2, for purposes of context, functions of the decoder and simulator of FIGS. 3 and 4 can be understood to be performed by the inference engine module ("inference engine"). In some embodiments the video data reduction system 250 is configured to transmit the encoded output from video navigation system 240 directly to the target device 210 for processing/video synthesizing by a local edge-based inference engine 228 as a standard process. In another embodiment, the video data reduction system 250 is configured to convey the encoded output from video navigation system 240 first to its own cloud-based inference engine 290 (also referred to as a video synthesizer 280 and decoder module 282 in the Mahapatra reference), or another remote inference engine, to translate and synthesize/generate the reduced video file.

For example, in some embodiments, the video synthesizer (inference engine) will produce data values and software instructions that, when executed, reconstruct or otherwise infer one or more video frames to be displayed by one or more video output devices based on a reference image and one or more codes or symbols. In one embodiment, one or more neural networks for video synthesizer infer one or more video frames using the reference image(s) as a base image in conjunction with information decoded from one or more codes to indicate updates to said reference image, for example as described in the Liu application. In yet another embodiment, the decision as to where to process the encoded data can be dynamic based on a determination made by a switch module as described in the Data Reduction (196-1011) reference.

As a general matter, the inference engine can receive the encoded file, as well as audio data and/or transcription data which can be used in parallel with the outputted synthesized video in cases where one of the participants speaks or otherwise causes a sound to be present in the video stream. Furthermore, in some embodiments, the inference engine is configured to obtain a reference frame (also referred to herein as a reference image or reference clip). With the reference frame and timestamped encoded behaviors, a simulated video can be produced in which the participants shown do not remain unrealistically static, nor rely on the incorporation of random or inauthentic expressions. Instead, the simulated video presents each participant engaging in their true-to-life behaviors, such as nodding, shaking their head, laughing, smiling, coughing, turning their face away, closing their eyes, resting their chin in their hand, etc., at the times that they actually exhibited such behavior. In some embodiments, each code can refer to a single type of behavior and so a single segment might be encoded with several codes for multiple overlapping behaviors (e.g., a code for winking and a code for smiling with the same timestamp, that together will cause the video synthesizer to present the person winking and smiling at the same time). Thus, the encoding module can generate a single code can encompass and 'stand for' multiple behaviors that are occurring simultaneously to represent a holistic or unified behavior.

It should be understood that the inference engine is able to transform each code in a manner that is seamless using transitional sequences. For example, the two second thumbs-up gesture will include, in those two seconds, the movement of the person's hand in preparation of producing the thumbs-up gesture, the actual thumbs-up gesture, and the return to the default hand pose. In cases where the thumbs-up code is for a longer duration, the period in which the actual thumbs-up gesture occurs will be extended. It should be understood that while numeric codes are described herein for purposes of simplicity, any other coding paradigm may be used, including alphanumeric, symbolic, and other coding techniques.

As shown in FIG. 2, in different embodiments, once the data from various sources for a particular video segment or stream ("video session") have been collected and validated for consistency, two outputs can be generated by the video data encoding system 230. A first output will include a transcript of the video session. A second output can include a 'marked-up' transcript of the same video session, and represents the encoded video file. The first transcript will include data such as speech-to-text of the video, as well as timestamps and, in some cases, speaker recognition and identification. The marked-up transcript, as the encoded video file, will include the same data, as well as the associated codes generated by the encoding module for that video session. In different embodiments, the encoded video data 236 and transcript, along with the reference image(s), and undefined content frame(s) (if any) are timestamped to ensure the data can be reconstructed coherently, in the correct order, and aligned precisely with other original or reconstructed video data obtained for the same period (e.g., reconstructions or recordings of original video content) before being shared with the video navigation system 240.

As noted earlier, the video navigation system 240 is configured to automatically and (in cases of streaming or live video) in real-time identify topics in the video content, and these identified topics can be proffered to the end-user as one mechanism by which to select or filter segments of video from the larger full video. In some embodiments, a topic analysis module 242 receives the outputted transcription data from the vide data encoding system 230.

As a general matter, in statistics and natural language processing, a topic model is a type of statistical model for discovering the abstract "topics" that occur in a collection of documents. Topic modeling is a frequently used text-mining tool for discovery of hidden semantic structures in a text body. Topic models of the disclosed systems can be configured to process a collection of documents to extract hidden thematic structures called topics. For purposes of this application, each topic is a label encompassing an ordered lists of contextually correlated words representing a concept. Topic modeling has many extensions based on the learning paradigm such as supervised, semi-supervised, transfer learning, hybrid and knowledge-based models. These extensions are designed to meet the specific demands and needs found in different application areas. For purposes of reference, the term "focus topic" will be used to describe a main topic (i.e., a target keyword) as well as its variants, the term "related topics" will be used to describe subjects most commonly associated with the main topics, and "secondary related topics" are those topics have some tangential relationship to a focus topic. Furthermore, a "primary topic" will be one which is discussed over a minimum proportion of the video (pre-selected by the user or a default setting), and a "secondary topic" is one that is discussed but only for a proportion of the video below the threshold. As an example, the threshold may be set to 40%. If a first topic is identified and the system determines the first topic is discussed for at least 40% of the speech occurring in the video, the first topic can be classified as a primary topic by the system. If a second topic is also identified and the system determines the second topic is discussed for only 20% (i.e., less than the threshold) of the speech occurring in the video, the second topic can be classified as a secondary topic.

In different embodiments, topic analysis module 242 can incorporate one or more topic modeling techniques. Some non-limiting examples include (1) a Latent Dirichlet Allocation (LDA), which a generative probabilistic model for discrete datasets such as text corpora, and the number of topics need not be pre-defined and can produce an explicit representation of a document; (2) Non-negative Matrix Factorization (NMF), a de-compositional, non-probabilistic algorithm using matrix factorization that on TF-IDF transformed data by breaking down a matrix into two lower-ranking matrices, where TF-IDF is a measure to evaluate the importance of a word in a collection of documents; (3) Top2Vec which includes an algorithm that uses word embeddings, where vectorization of text data makes it possible to locate semantically similar words, sentences, or documents within spatial proximity (for example, words like "mom" and "dad" should be closer than words like "mom" and "apple"); and (4) BERTopic, which uses BERT as an embedder, and provides document embedding extraction, with a sentence-transformers model for more than 50 languages, etc. Other modeling techniques can also include BILS™, Deep Average Network (DAN), Attentional Deep Average Network (ADAN), Contextual Deep Average Network (CDAN), word embeddings, embedded topic models, explicit semantic analysis, latent semantic analysis, Hierarchical Dirichlet process, and/or non-negative matrix factorization, etc. It can be appreciated that accurate prediction of conversation topics can be a valuable signal for creating coherent topic-based chapters and accurate topic mapping. In some embodiments, the system can implement neural topic classification and unsupervised topic keyword detection techniques as well as incorporate conversational context and dialog act features.

In some embodiments, topic analysis module 242 can also implement lifelong topic modeling (LTM) techniques, where topics are continuously learned and refined based on previously accumulated knowledge and processing of new information. LTM does not require external guidance to analyze a dataset or to mine rules from it and can exploit the huge volume of data processed in the past and the overlap in their concepts to identify global patterns, enabling an unsupervised analysis of continuously arriving data from diverse sources. In some embodiments, the topic analysis module 242 can further include hierarchical topic modeling techniques, which organize the topics in a hierarchical structure thereby allowing the topics to be viewed at different levels of granularity. The topics at higher levels are abstract and become more specific down the hierarchy. The incorporation of hierarchical topics in lifelong topic models can allow the system to examine the topics at different levels of granularity and adjusting the granularity as new information becomes available.

In addition, some embodiments may use or include artificial intelligence techniques. These artificial intelligence techniques may include Natural Language Processing (NLP). Any kind of NLP may be used. In some cases, Large Language Models (LLMs) may be used. Some LLMs may include a very large number of parameters, in some cases LLMs may use hundreds of billions or trillions of parameters. To accommodate this scale of computing, these LLMs may be executed on custom, proprietary machine learning processors or chips. However, in other embodiments, LLMs may be executed using commercially available hardware. A non-limiting example of an LLM running on proprietary hardware is the Bidirectional Encoder Representations from Transformers (BERT)-Large language model that runs on 1,472 NVIDIA V100 GPUs. Another non-limiting example of an LLM running on proprietary hardware is Google Research's Pathways Language Model (PaLM) that runs on a cluster of 6144 proprietary TPU chips. Other examples of LLMs include Gopher by DeepMind and OpenAI's GPT-3 (Generative Pre-Trained Transformer-3). The preparation and the amount of training provided to the LLMs prior to use may vary. In some cases, very little training may be provided to the LLM. In some embodiments, the LLM is trained with zero-shot or few-shot. In other embodiments, the initial training includes fine tuning techniques. In different embodiments, the system can use one or more machine learning models-such as deep neural networks (DNNS)—to perform various tasks with respect to identifying topics. For example, a large language model (LLM) may use common sense reasoning to analyze textual content (e.g. text, codes, symbols, characters) associated with a video, an audio, a transcript or a stream of a meeting, conference call, presentation, or any other encounter to determine topics, sections or other discrete parts of the encounter. Further the LLM may receive textual content from another model earlier in the pipeline like an Image Captioning Machine Learning Model that is describing images. The LLM may also be used to collect, gather or arrange the various topics together.

In different embodiments, the output of the topic analysis module 242 can provide insights into key moments of the video. For example, the topic analysis models can allow the system to identify specific moments (timestamped frames or video snippets) where a particular topic has been mentioned during its topic detection 244, as well as aspects or characteristics 246 of the speech such as user sentiments, topic level sentiments via sentiment classification techniques used in conjunction with the topic analysis module, topic hierarchies in which parent-child relationships can be used to model the contextual structure of a conversation or speech, and topic ranking which can identify the larger themes in the video that can be used to auto-generate bookmarks or chapters in the video and/or re-arrange a video based on the identified themes.

The output of the topic analysis module 242 can be provided to a video topic mapper 260 of playback manager 292. In different embodiments, the topic mapper 260 is configured to map the detected topics to the relevant sections of the transcript, and create an indexable and easily searchable source of data representing the video content as a set of topic-labeled segments. This information can be used by the playback manager 292 to provide filtering or playback options through a playback options module ("playback options") 264 to the end-user via a video navigation user interface 266. These options allow the user to manage their viewing of the video, as well as reorganize and/or remove and/or curate specific portions of the video before initiating video synthesis and playback. Once the user makes a topic-based selection, a segment selection module 270 can extract the encoded portions (segments) of the encoded data 236 that align with the user's selection, and rearrange these segments per the user's request or preferences via a segment consolidation module 272. A tailored or personalized encoded data file 280, prepared by a spliced encoded video generator 274, can thus differ significantly from the encoded data 236 that was initially generated by the video data encoding system 230 in many facets, including length, number of codes, order of codes, etc.

Figure 5:
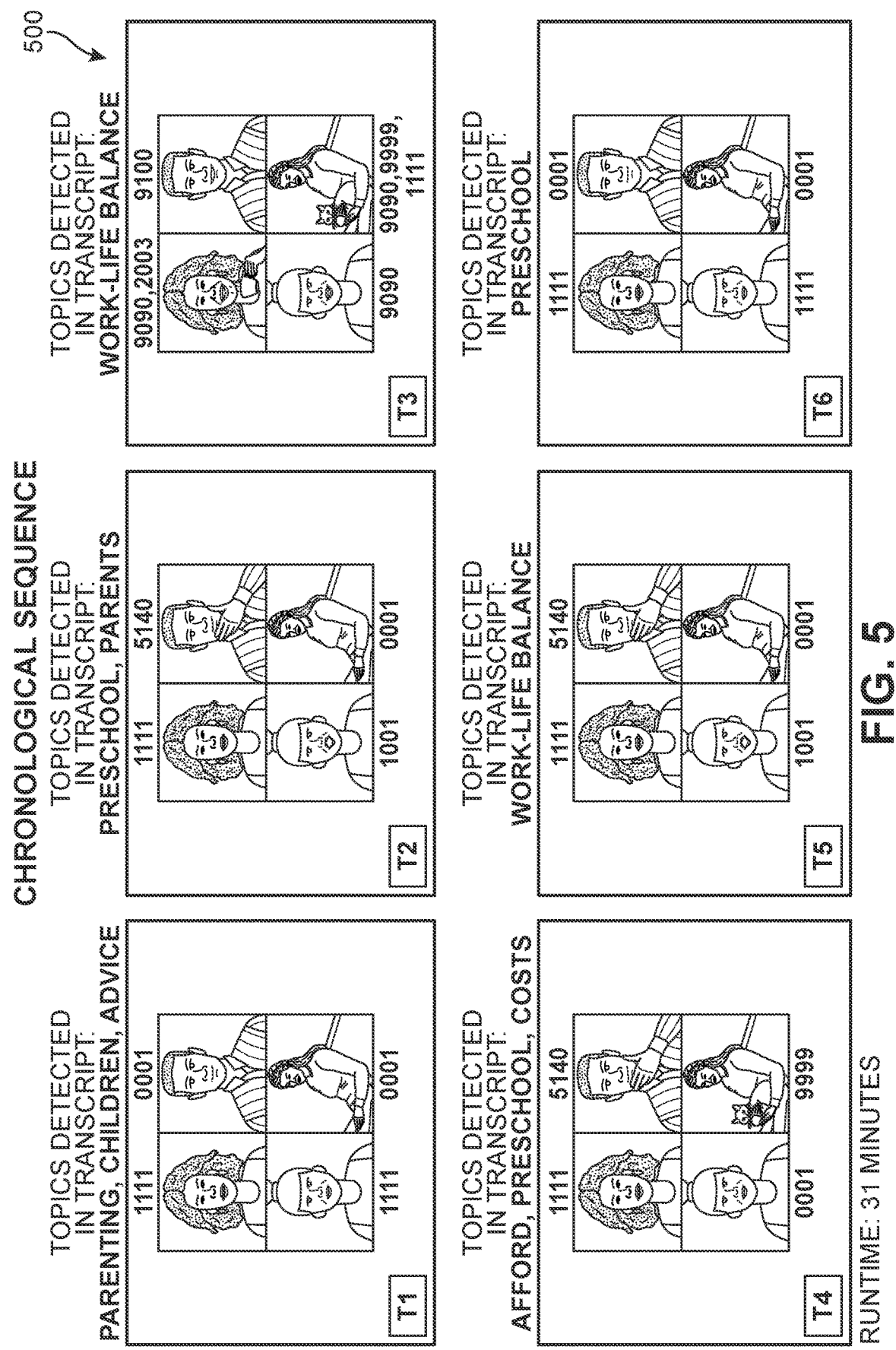
FIGS. 5 and 6 provide a comparison of chronological sorting of video segments and topic-based sorting, according to an embodiment.
Figure 6:
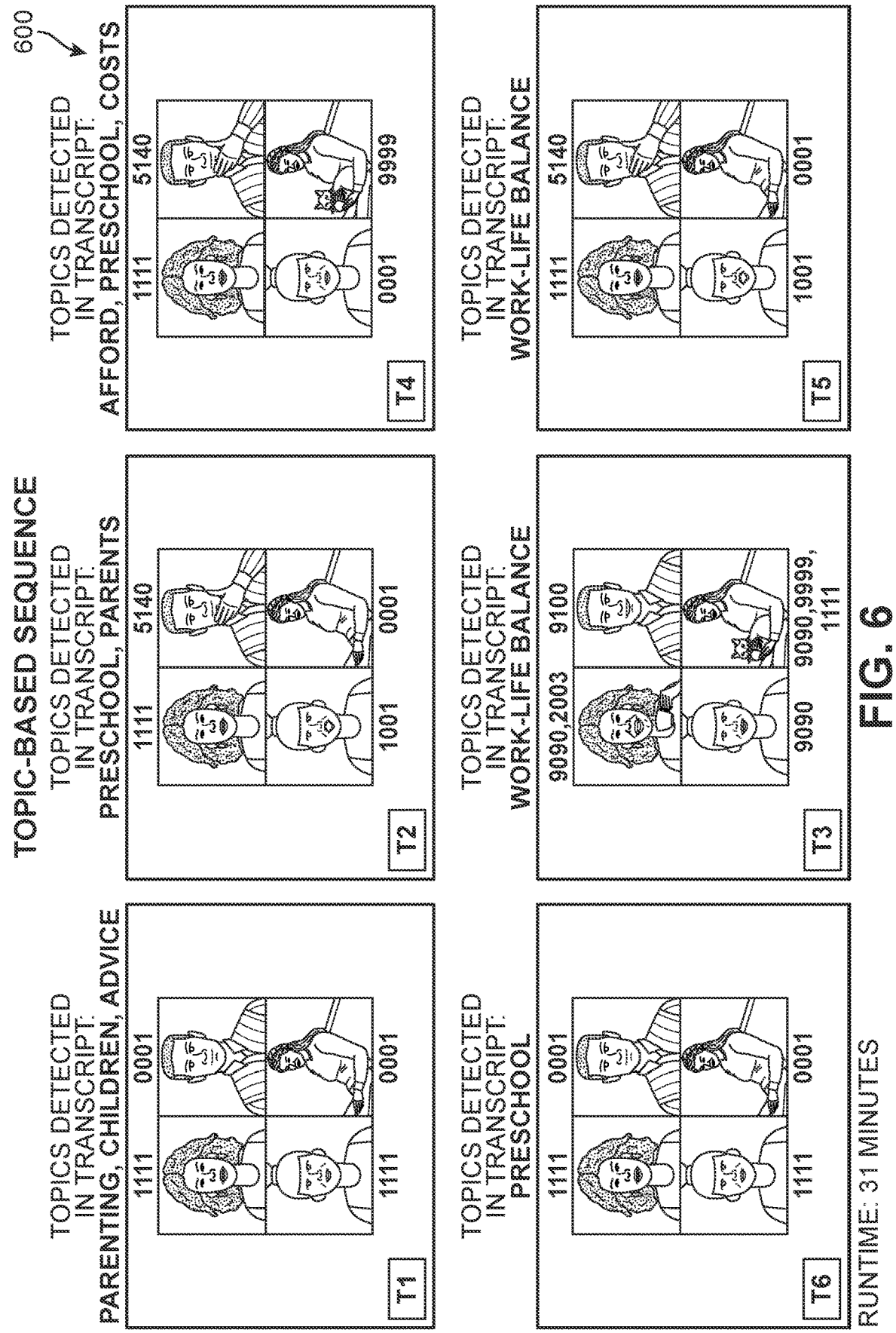

For purposes of illustration, an example in which such automated topic labeling and/or reorganization of video segments can occur is shown with reference to FIGS. 5 and 6. As a general matter, a video can be understood to comprise multiple video segments that are consolidated into a single content and played back. In FIG. 5, a first video playback 500 is depicted that corresponds to the standard chronological ordering of a video. The playback is depicted as including six sequential video segments, ordered to match what the playback of the original video content (before encoding) would have been.

As described above, the video data reduction system 250 of FIG. 2 receives the original video content 202 and generates encoded data 236 that represents or stands-in for the original video content 202. When the encoded data 236 is then used to synthesize a video via an inference engine (see below), the outputted video can be represented by, for example, the video being depicted during a first video playback 500 of FIG. 5. As noted earlier, in different embodiments, the video data encoding system 230 of FIG. 2 also sends the transcription for the original video to the topic analysis module 242, which is configured to identify one or more topics, keywords, themes, ideas, items, etc. that were discussed or spoken of during the video.

For ease of reference, in FIG. 5, the segments include a first segment that corresponds to a first time period T1 of the original video, a second segment that corresponds to a subsequent second time period T2 in the original video, a third segment that corresponds to a subsequent third time period T3 in the original video, a fourth segment that corresponds to a subsequent fourth time period T4 in the original video, a fifth segment that corresponds to a subsequent fifth time period T5 in the original video, and a sixth segment that corresponds to a subsequent sixth time period T6 in the original video. In other words, when the video was made or recorded, this would be the 'normal' or standard chronological order in which the video events occurred.

In the illustration of FIG. 5, each of the six video segments is shown with example topics that were identified as being discussed or mentioned during that particular segment. For purposes of this example, the topic analysis model has determined that the first segment (T1) is associated with the topics Parenting, Children, and Advice, the second segment (T2) is associated with the topics Preschool and Parents, the third segment (T3) is associated with the topic Work-Life Balance, the fourth segment (T4) is associated with the topics Afford, Preschool, and Costs, the fifth segment (T5) is associated with the topic Work-Life Balance, and the sixth segment (T6) is associated with the topic Preschool. In some embodiments, the topics are listed in order of their prominence during the given segment (e.g., in the first segment, parenting is a primary topic and is determined to be a topic of more relevance or discussed more directly/longer than children or advice). In some embodiments, each segment can be shown with the identified topics and offered to the user as distinct chapters that can be selected and directly navigated to, representing a chronological storyboard interface.

In contrast, if the end-user-either via their user preferences 278 or selections made via user interface 266 and received by an input processor 268 of FIG. 2—requests that the video segments be reorganized in a sequence that is topic-dependent rather than time-dependent, the proposed system can in some embodiments automatically and alternatively generate a different, second video playback 600 (see FIG. 6) sequence that corresponds to the parameters of the user's request. In some embodiments, the playback manager 292 can also be configured to automatically generate bookmarks based on specific topics. In FIG. 6, the six segments have been reordered to allow for a continuity in topic discussions. For example, the second video playback 600 still begins playback with the first segment (T1) and the second segment (T2), which both relate to parenting/parents. However, as second segment (T2) also includes discussion of preschool, which is further discussed in fourth segment (T4), the fourth segment (T4) is moved to play directly after second segment (i.e., to now be played earlier than the third segment). Similarly, sixth segment (T6) also discussed preschool and has also been shifted to follow directly after fourth segment, such that playback of the sixth segment occurs before the third segment. Finally, the remaining two segments (third segment and fifth segment) which discuss work-life balance are collected and arranged for playback following the sixth segment. In other words, the ordering of the segments has been modified to align with the topics that were detected by the topic analysis module. In some embodiments, each segment can be shown with the identified topics and offered to the user as distinct chapters that can be selected and directly navigated to, representing a topic-based storyboard interface.

In some embodiments, the playback manager 292 of FIG. 2 can select a topic order that is based on the video length of a given topic (longest to shortest), or the end-user can review the list of topics that were identified and custom-select a topic order for the video playback. For example, if a user selects two topics from a list of topics as identified by the playback manager 292, the playback manager 292 can then re-order the video playback to prioritize segments in which those topics were discussed. In addition, in some embodiments, the playback manager 292 is configured to offer options that narrow or curate playback to only those segments that discuss or include reference to one or more specific topics as chosen by the end-user.

Figure 7:
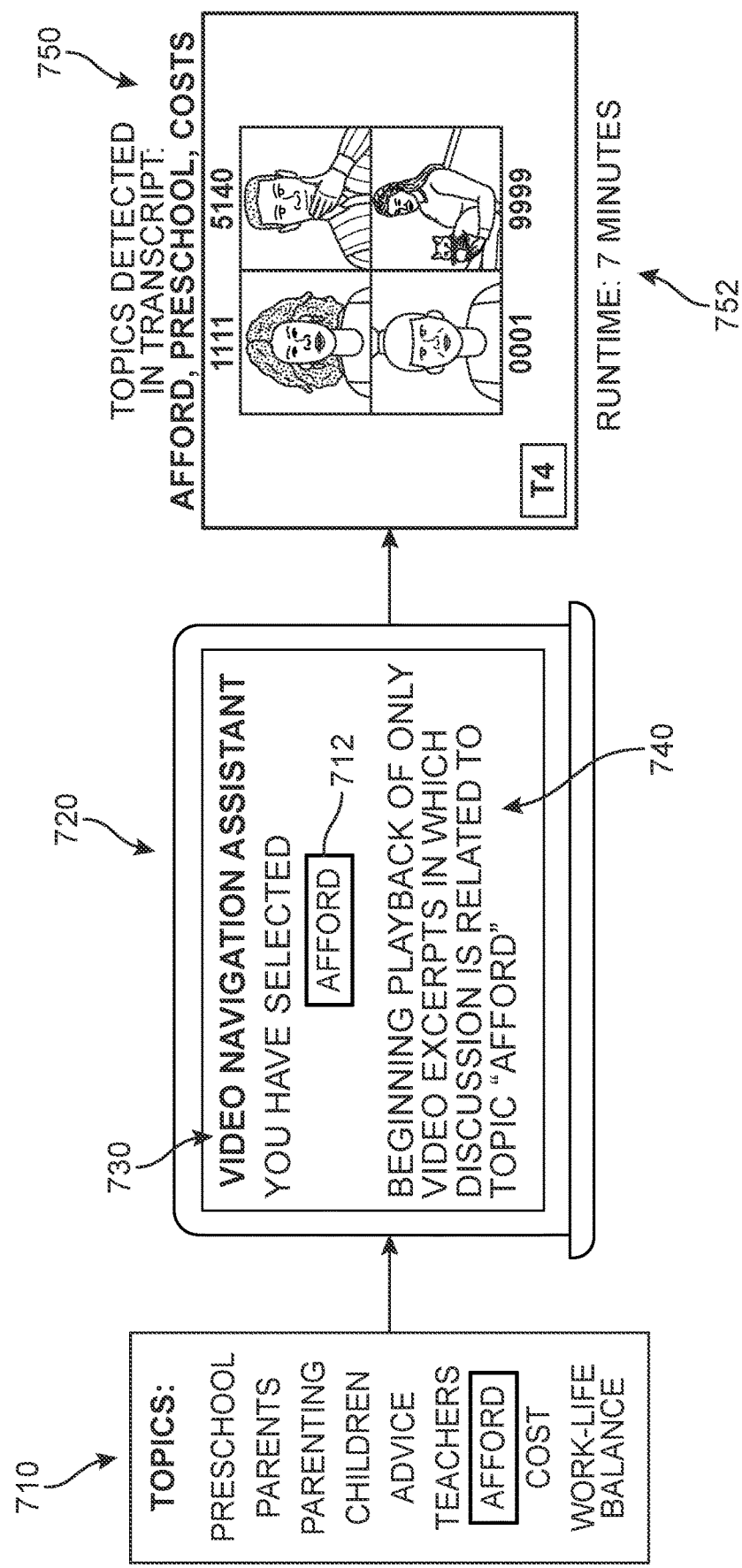
FIG. 7 is an example user navigation interface that allows a user to filter a video based on a topic, according to an embodiment.

An example of this type of process is shown in conjunction with FIG. 7. In FIG. 7, a first topic list 710 has been created, for example by the topic analysis module 242 of the video navigation system 240 of FIG. 2. The UI 266, working with playback options 264, presents the identified topics to the end-user, for example via a computing device 720 accessing a video navigation assistant 730. The end-user, for purposes of this example, makes a selection of a single topic ("Afford"), which the video navigation assistant 730 confirms in a first confirmation message 740 ("You have selected AFFORD/Beginning playback of only those video excerpts in which there is discussion relating to the topic AFFORD"). In response to this selection, the video navigation system 240 extracts or isolates the video segment that included speech that related to the topic AFFORD. In this case, only the fourth segment (T4) included such discussion, and so only the encoding for the fourth segment is retrieved by the segment selection module 270 and is prepared or spliced by the segment consolidation module 272. The spliced encoded video generator 274 produces an abbreviated version of the encoded data 236. When synthesis based on this subset of the encoded data 236 is performed, only the fourth segment is recreated, and so playback has a much shorter runtime (7 minutes) relative to the full video (31 minutes).

Returning to FIG. 2, in different embodiments, in addition to the topic mapping features offered by the playback manager 292, the video navigation system 240 can be configured to take advantage of the behavior-specific codes that are generated by the video data encoding system 230 (i.e., encoded data 236). For example, as shown in FIG. 2, in some embodiments, a code indexer module 262 receives the encoded data 236 of the full video and can work with playback options 264 to allow the end-user to search through the video based on a specific code (or its descriptive label) that was assigned during processing by the video data encoding system 230. In different embodiments, the code indexer module 262 is configured to serve as an interactive navigation repository of codes that can be displayed or offered to the end-user. The options shown to the user can also include the code's attached descriptive label (e.g., 4876="sneeze"), or only show the descriptive labels.

In some embodiments, the output of the code indexer module 262 can be used by the playback manager 292 to provide filtering or playback options through the playback options module 264 to the end-user, presented via a video navigation user interface 266. These options allow the user to manage their viewing of the video, as well as reorganize and/or remove and/or curate specific portions of the video before initiating video synthesis and playback. Once the user makes a code-based selection, a segment selection module 270 can extract the encoded portions (segments) of the encoded data 236 that align with the user's selection, and rearrange these segments per the user's request or preferences via a segment consolidation module 272. A tailored or personalized encoded data file 280, prepared by a spliced encoded video generator 274, can thus differ significantly from the encoded data 236 that was initially generated by the video data encoding system 230 in many facets, including length, number of segments, order of segments, etc.

Figure 8A:
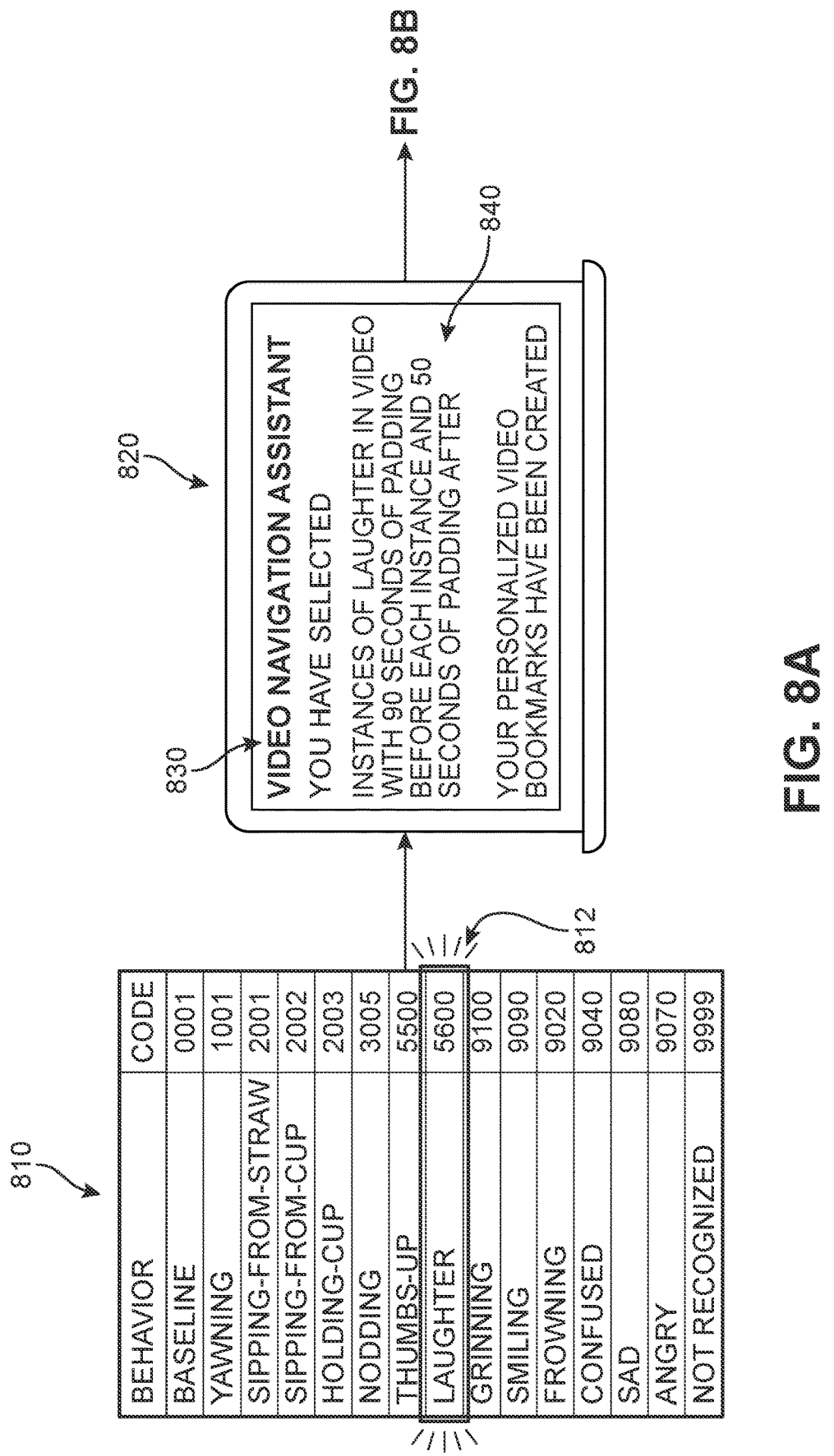
FIGS. 8A and 8B depict an example of a user navigation interface that allows a user to filter a video based on an associated code or participant/behavioral classifications, according to an embodiment.
Figure 8B:
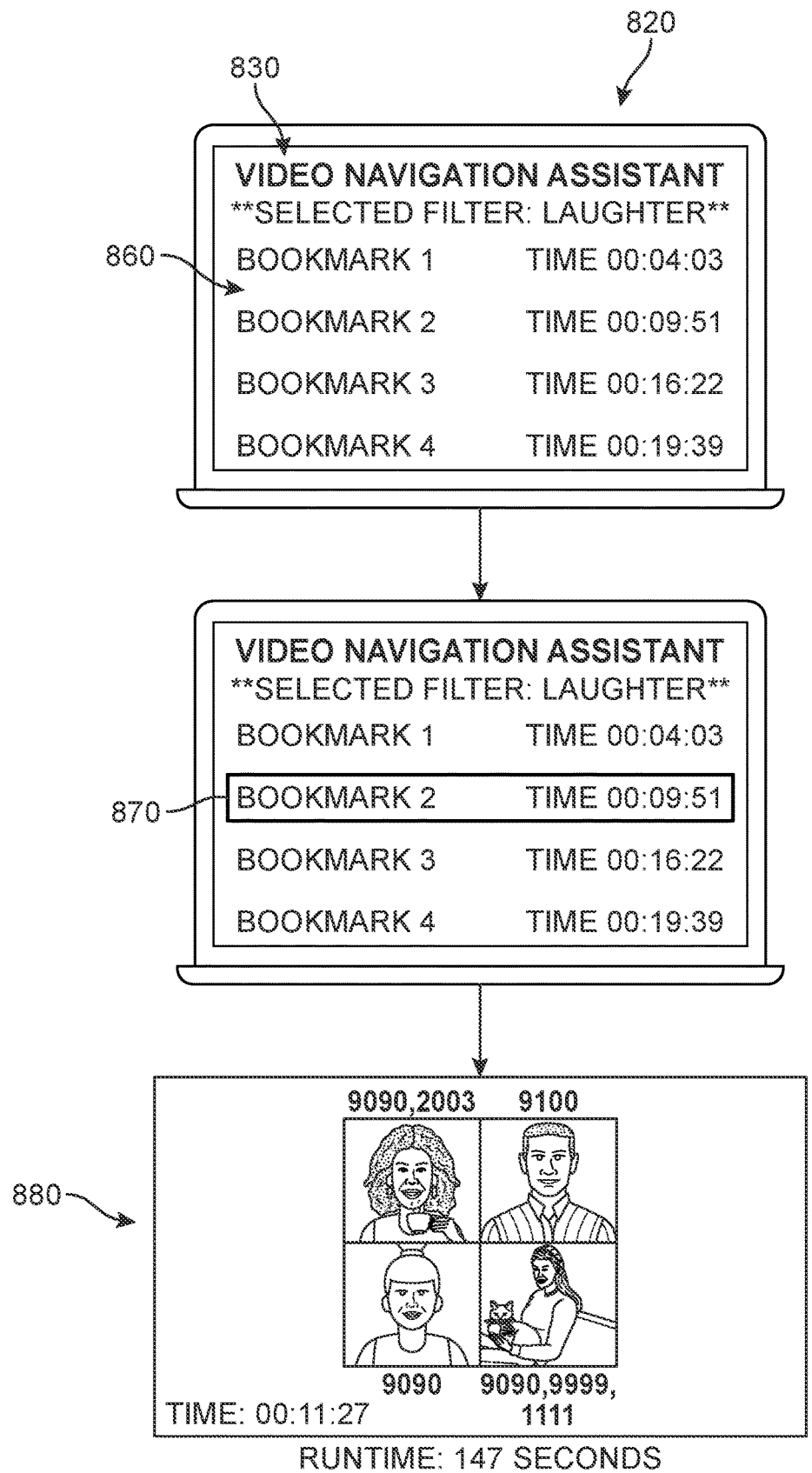

An example of this process is shown in conjunction with FIGS. 8A and 8B. In FIG. 8A, a first code chart 810 has been created, for example by the code indexer module 262 of the video navigation system 240 of FIG. 2. This simplified code chart is shown only to help the reader better visualize the compression process, and does not in any way limit the encoding mechanisms that may be used herein. Once the model has identified a behavior in a video segment, the encoding module transformed said video segment to a code. With respect to a first video segment, a first code corresponding to "nodding" such as "3005" can be used to entirely replace the first video segment. In some cases, the code can include duration, such that "3005:4" or "3005.4" etc. can be used to indicate the head is to nod for four seconds at the appropriate time. In another example, the code can include intensity, such as how fast or slow the person is performing the behavior (i.e., nodding) on a scale of 1-9. For example, a video segment of a person nodding very quickly for four seconds may be encoded as "3005.4.9", which will enable the video synthesizer to not only reconstruct the nodding action, but the rapid speed with which the nodding was occurring.

In different embodiments, the UI 266 of FIG. 2, working with playback options 264, presents the identified behavior codes to the end-user, for example via a computing device 820 accessing a video navigation assistant 830 depicted in FIG. 8. The end-user, for purposes of simplicity in this example, makes a selection of a single code 812 ("Laughter/5600"), which the video navigation assistant 830 confirms in a second confirmation message 840 ("You have selected instances of laughter in video with 90 seconds of padding before each instance and 50 seconds of padding after . . . . Your personalized video bookmarks have been created"). In response to this selection, the video navigation system 240 extracts or isolates all of the video segments that included behaviors identified as laughter via segment selection module 270. In other words, all segments in which any of the participants had been assigned a 5600 code are collected. The padding values that will be applied (how much video will be included before and after the selected encoded event) can be selected by the user and stored in the user preferences, or the UI 266 can include additional options for adjusting the padding values.

Referring next to FIG. 8B, it can be seen that the video navigation system has identified at least four instances in the video in which a laughter event has occurred, as indicated by a bookmark menu 860 ("Selected Filter: Laughter/Bookmark 1=Time 00:04:03/Bookmark 2=Time 00:09:51/Bookmark 3=Time 00:16:22/Bookmark 4=Time 00:19:39"). Thus, four segments have been automatically 'pulled' from the video in response to the user's selection. These four segments are then used to restructure the video, per the user's instructions. The listed times represent the start times of each of the four 140+ second chapters that have been generated (i.e., based on padding values and how long the coded event lasted).

In some embodiments, the user's preferences can dictate how much time around the event should be included ("padding"). For example, in this case, the user can be understood to have requested that 90 seconds before the point(s) in the video where the "laughter" code had been assigned be added to the playback, as well as 50 seconds after the point(s) in the video where the "laughter" code had been assigned. In other examples, the 'before' padding and 'after' padding can have different values, respectively, including a value of zero. In other embodiments, the user can select additional codes for auto-generation of chapters (e.g., laughter+smile) that could increase the number of chapters that are generated. The video data that only comprises these four chapters and corresponding bookmarks will be prepared by the segment consolidation module 272, and a new encoded file based on this video data is produced by the spliced encoded video generator 274. This modified encoded data will be used in the synthesis of a sequence of segments that correspond to the user's selection, which can represent a smaller video playback length than the original content. In other words, the original video (which was 31 minutes long for purposes of this example) can be filtered before playback to limit the synthesis to only the selected chapters (less than 31 minutes) that correspond to the events represented by the selected codes.

In this case, the user views the list of chapters, and selects a second bookmark 870 for playback. The video navigation system isolates the encoding for the second chapter and begins playback of a second chapter 880 that starts at time 00:09:51. The laughter "event" in this case was determined to last 7 seconds, so with the 90 seconds added before and 50 seconds after, the total runtime of this one chapter becomes 147 seconds.

As noted earlier, in some embodiments, the video navigation system is configured to pre-synthesize some portions of the video to reduce load times. In different embodiments, pre-loader module 276 of FIG. 2 is configured to transmit instructions to an inference engine 290 that causes the inference engine 290 to pre-synthesize several seconds of video that are associated with the start time of each automatically generated chapter. In other words, in the example of FIGS. 8A and 8B, playback of each chapter is based on a set of codes that represent the images for that video segment. The inference engine 290 can pre-synthesize frames corresponding to an initial subset of the full set of codes for each of the four chapters. When the user selects the second bookmark 870, the second chapter 880 will immediately—with no lag or delay—begin to play, as the first 5-10 seconds had been pre-loaded. While this initial playback occurs, the remaining codes for the second chapter 880 will also be synthesized, resulting in a substantially seamless and continuous playback experience. It should be appreciated that this technique can also be implemented by the system for automatically-generated topic-based chapters. In other words, when chapters are created in which multiple video segments are divided by topic, an initial subset of codes representing the first 30 seconds (or other time frame) of the chapter can be pre-loaded by the inference engine to offer the same type of playback efficiency and improved viewer experience.

Figure 9:
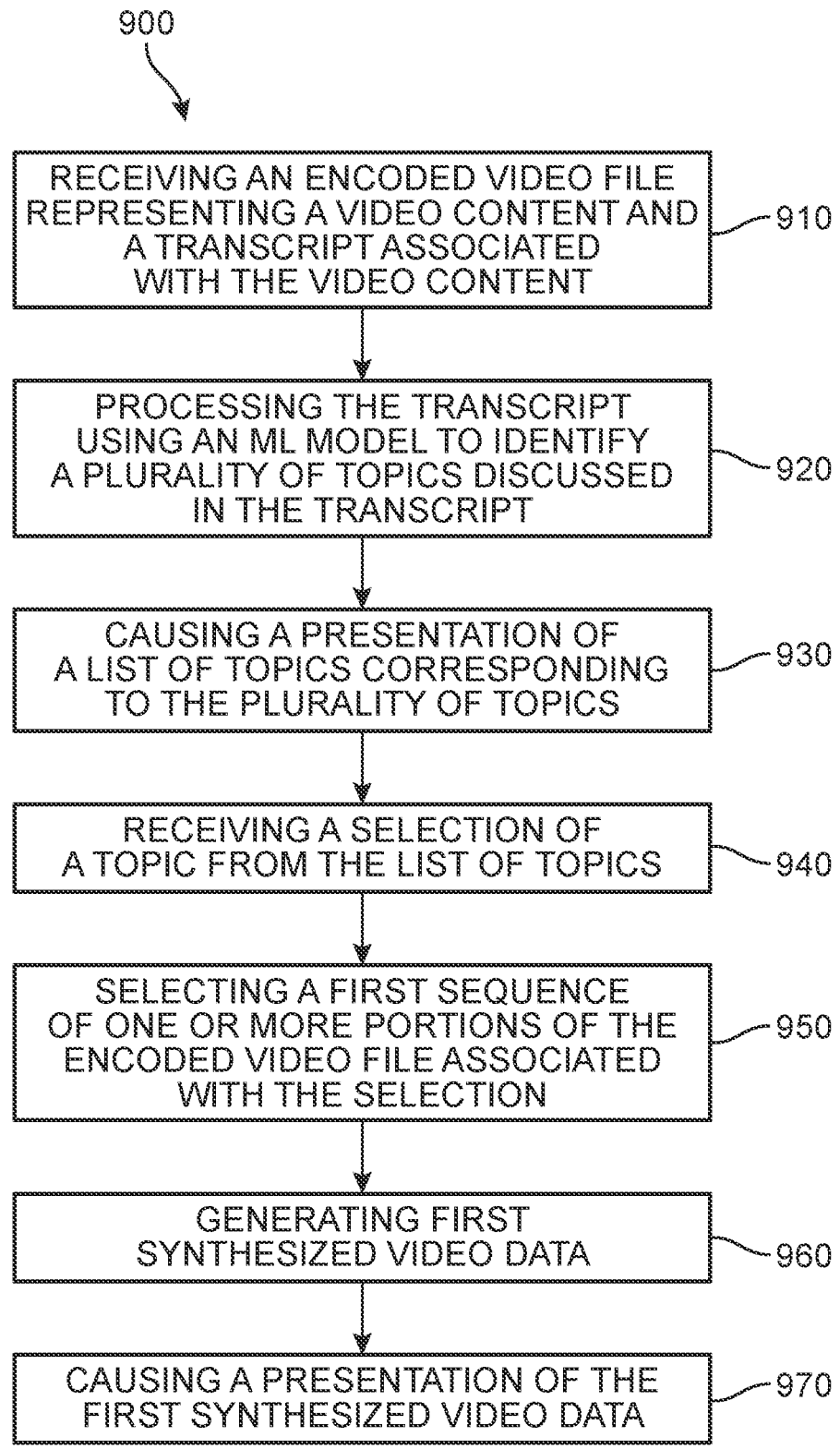
FIG. 9 is a flow diagram of a process of computer-implemented method for navigating through video content, according to an embodiment.

FIG. 9 is a flow chart illustrating an embodiment of a computer-implemented method 900 of facilitating navigation through video content. The method 900 includes a first operation 910 of receiving, at a video navigation system, an encoded video file representing a first video content, as well as a first transcript associated with the first video content. The method also includes a second operation 920 of automatically identifying, at the video navigation system and using a topic analysis machine learning model, a plurality of topics discussed in the first transcript, and a third operation 930 of generating and presenting, via the video navigation system and at a first computing device, a user interface including a first list of topics based on the plurality of topics, each topic in the first list of topics corresponding to a selectable navigation option. A fourth operation 940 includes receiving, at the video navigation system and from a first user via the first computing device, a selection of a first topic from the first list of topics, and a fifth operation 950 includes selecting, at the video navigation system and in response to the selection of the first topic, a first sequence of encodings corresponding to one or more portions of the encoded video file that are associated with the first topic. Furthermore, the method 900 includes a sixth operation 960 of generating, via a video synthesizer and based only on the first sequence of encodings, first synthesized video data, and a seventh operation 970 of initiating, via the video navigation system, a first playback session presenting the first synthesized video data.

In different embodiments, the method 900 can include additional operations or aspects. For example, the method 900 can also include operations of classifying, at the video navigation system, each topic of the plurality of topics as either a primary topic or a secondary topic, and selecting, at the video navigation system, only those topics classified as a primary topic to appear in the first list of topics. In some embodiments, the first sequence of encodings corresponds to at least a first portion and a second portion of the encoded video file, and the first portion and the second portion were chronologically spaced apart in the encoded video file. For purposes of this application, the term "chronologically spaced apart" refers to two portions or segments of video-based content that do not directly follow one another in time; in other words, a first portion represents a first time period "A" in the video, and a second portion represents a time period "C" in the video, and the first portion and second portion are separated or spaced apart by a time period "B" (some other portion of the video). While the first portion and the second portion may be related in that they each discuss the same topic, they occurred with a gap between them during which another topic had been discussed or some other non-related/non-relevant event had occurred.

In another example, the first synthesized video data includes a first synthesized video segment corresponding to the first portion and a second synthesized video segment corresponding to the second portion. In such cases, the method can also include operations of determining, at the video navigation system, the first portion involves discussion of the first topic, receiving, at the video navigation system, a request to pad the first portion with an additional, third portion that occurs directly after the first portion in the encoded video file, generating, via the video synthesizer, a third synthesized video segment based on the third portion of the encoded video file, inserting the third synthesized video segment into the first synthesized video data to produce a second synthesized video data, and initiating, via the video navigation system, a second playback session of the second synthesized video data.

In different embodiments, the method 900 also includes operations of receiving, at the video navigation system and from the first computing device, a selection of a second topic from the first list, selecting, at the video navigation system and in response to the selection of the second topic, a second sequence of encodings corresponding to one or more portions of the encoded video file that are associated with the second topic, generating, via the video synthesizer and based only on both the first sequence and second sequence, second synthesized video data, and initiating, via the video navigation system, a second playback session presenting the second synthesized video data.

In another embodiment, the method 900 can also include receiving, at the video navigation system and from the first computing device, a selection of a second topic from the first list, selecting, at the video navigation system and in response to the selection of the second topic, a second sequence of encodings corresponding to one or more portions of the encoded video file that are associated with both the first topic and the second topic, generating, via the video synthesizer and based only on the second sequence, second synthesized video data, and initiating, via the video navigation system, a second playback session presenting the second synthesized video data.

In some embodiments, the first sequence of encodings corresponds to at least a first portion and a second portion of the encoded video file, and the first synthesized video data includes a first synthesized video segment corresponding to the first portion and a second synthesized video segment corresponding to the second portion. In such cases, the method can further include presenting, via the video navigation system and at the first computing device, a storyboard-based user navigation interface in which the first synthesized video segment is a first chapter and the second synthesized video segment is a second chapter. In one embodiment, the user navigation interface includes a plurality of selectable options, and the first chapter is represented by a first selectable image, and the second chapter is represented by a different, second selectable image. In some cases, the first selectable image corresponds to an initial frame of the first synthesized video segment and the second selectable image corresponds to an initial frame of the second synthesized video segment. In another example, the method includes receiving, via the user navigation interface, a selection of the second selectable image, and causing, at the video navigation system, playback of the first synthesized video data to begin from the initial frame of the second synthesized video segment.

In some embodiments, the first sequence of encodings corresponds to at least a first portion of the encoded video file, and the first synthesized video data includes a first synthesized video segment corresponding to the first portion. In such cases, the method can also include pre-loading a first sub-segment of the first synthesized video segment that is less than an entirety of the first synthesized video segment. Such pre-loading of the first sub-segment can be of a first subset of frames that is smaller than the entire group of frames that represent the synthesized video segment, or in the case of encoded data, a first subset of codes from the entire group of codes that comprise the segment can be pre-synthesized. In some embodiments, the subset can be approximately 2-5% of the total. In addition, in some embodiments, the method can further include pre-loading a second sub-segment that is less than an entirety of the second video segment, and so forth, so that each segment-chapter is ready for immediate playback.

Other methods can also be contemplated within the scope of this disclosure. For example, a computer-implemented method of facilitating navigation through video content is disclosed. The method includes a first operation of receiving, from a video data encoding system and at a video navigation system, a first encoded behavior file using a timestamped sequence of codes to represent facial expressions and poses of participants detected during first video content, a second operation of receiving, from a first user via a first computing device and at the video navigation system, a selection of a first behavior that corresponds to a first code, and a third operation of initiating, via the video navigation system, a first playback session presenting second video content that includes only those portions of the first video content associated with the first code.

In other embodiments, the method may include additional operations or aspects. In one embodiment, the method also includes generating and presenting, via a user interface of the video navigation system and at the first computing device, a first list of behaviors based on the sequence of codes, each behavior in the first list being a selectable option, where the selection of the first behavior is made through the first list. In some embodiments, the method can include operations of locating, via the video navigation system and in response to the selection of the first behavior, all instances of the first code that occur in the first encoded behavior file, and presenting, via the video navigation system and at the first computing device, a navigation user interface with a plurality of selectable bookmarks, where a first instance of the first code in the first encoded behavior file is represented by a first bookmark and a second instance of the first code in the encoded behavior file is represented by a second bookmark. In another embodiment, the method can also include operations of receiving, from the first computing device and at the video navigation system, a selection of the second bookmark, and causing, at the video navigation system, playback of the second video content to begin at the second instance in which the first behavior occurs.

In another example, the system can receive a selection of a preference option in which the user chooses the level of feature discrimination that should be applied by the system and/or the frequency by which the system will classify a behavior in the video. In one case, the system will then apply a more detailed or discrete level of classification with further subclassifications, or can apply a more broad or high-level of classifications in which only a few behaviors are classified and the detection of the default (resting) state of a person is more likely to occur. In another example, based on a high frequency selection, the system will parse the video into segments based on the frequency (time interval) selected. Each segment corresponds to a set of frames having one or more video frames. In some embodiments, the video data is obtained via a videoconferencing application such as Zoom®, Microsoft Teams®, Slack®, or other communication apps, etc. As described herein, the proposed systems can be used to automatically generate bookmarks or pre-loaded chapters in a video based on detected topics and/or codes.

Other methods can also be contemplated within the scope of this disclosure. For example, in other embodiments, a method of navigating through video content includes a first operation of receiving, at a video navigation system, a first transcript for a first video content, the first video content including a plurality of video segments, the first transcript being timestamped and, in some cases including an encoding of the first video content (as described herein). A second operation includes automatically identifying, at the video navigation system and using a topic analysis machine learning model, a plurality of topics discussed in the first transcript. A third operation includes generating and presenting, via the video navigation system and at a first computing device, a first list of topics based on the plurality of topics, each topic in the first list corresponding to a selectable navigation option. In addition, the method includes a fourth operation of receiving, from a first user via the first computing device, a selection of a first topic from the first list. A fifth operation includes initiating, via the video navigation system and in response to the selection of the first topic, a first playback session presenting second video content that includes only those video segments of the plurality of video segments that correspond to portions of the first transcript which the video navigation system determines have a high likelihood of discussing or involving the first topic. In other words, the method can also include an operation of determining, at the video navigation system, that reference to the first topic is made during only a specific segment of the video content.

In different embodiments, this method can include additional operations or aspects. For example, the method can also include operations of classifying, at the video navigation system, each topic of the plurality of topics as either a primary topic or a secondary topic, and selecting, at the video navigation system, only those topics classified as a primary topic to appear in the first list of topics. In addition, in some embodiments where the second video segment includes a first video segment and a second video segment, the method can further include operations of extracting, at the video navigation system, at least the first video segment and the second video segment from the first video content, the first video segment and second video segment being chronologically spaced apart from one another in the first video content, and splicing the first video segment and the second video segment together in the second video content such that the second video segment immediately follows the first video segment during the first playback session.

In some embodiments, the method also includes operations of determining, at the video navigation system, at least a first video segment of the first video involves discussion of the first topic, receiving, at the video navigation system, a request to pad the first video segment with an additional, second video segment that occurs directly before or after the first video segment in the first video content, extracting both the first video segment and the second video segment as a single continuous third video segment, and including the third video segment in the second video content. In another example, the method also includes operations of receiving, from the first computing device, a selection of a second topic from the first list, and initiating, via the video navigation system, a second playback session presenting only those video segments of the first video content which the video navigation system determines have a high likelihood of discussing either the first topic or the second topic. In such cases, the resulting video will typically be relatively longer as the selected segments can include either of the topics, and a greater number of segments are likely to be extracted. In another example, the method further includes operations of receiving, from the first computing device, a selection of a second topic from the first list, and initiating, via the video navigation system, a second playback session presenting only those video segments of the first video content which the video navigation system determines have a high likelihood of discussing both the first topic and the second topic. In such cases, the resulting video will be relatively shorter as the selected segments must include discussion of both topics and fewer segments are likely to be extracted.

In different embodiments, the method can also include operations of determining, at the video navigation system, at least a first video segment and a second video segment from the first video content have a high likelihood of discussing the first topic, and presenting, via the video navigation system and at the first computing device, a storyboard-based user navigation interface in which the first video segment is a first chapter of the second video content and the second video segment is a second chapter of the second video content. In one example, the user navigation interface includes a plurality of selectable options, and the first chapter is represented by a first selectable image, and the second chapter is represented by a different, second selectable image. In another example, the first selectable image corresponds to the first frame of the first video segment and the second selectable image corresponds to the first frame of the second video segment.

In some embodiments, the method further includes operations of receiving, via the user navigation interface, a selection of the second selectable image, and causing, at the video navigation system, playback of the second video content to begin from the first frame of the second video segment. In another example, the method also includes operations of determining, at the video navigation system, at least a first video segment and a second video segment from the first video content have a high likelihood of discussing the first topic, and pre-loading a first sub-segment that is less than an entirety of the first video segment, such as a first subset of frames that is smaller than the entire group of frames that represent the video segment, or in the case of encoded data, a first subset of codes from the entire group of codes that comprise the segment are pre-synthesized. In some embodiments, the subset can be approximately 2-5% of the total. In addition, in some embodiments, the method can further include pre-loading a second sub-segment that is less than an entirety of the second video segment, and so forth, so that each segment-chapter is ready for immediate playback.

It should be understood that, in different embodiments, the operations disclosed above for each of these methods can be implemented as a system that includes a processor and machine-readable media including instructions which, when executed by the processor, cause the processor to perform each of the recited operations.

Media generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA® Geforce Now (GFN), Google® Stadia, and the like.

In addition, sound or other audio generated applying one or more of the techniques disclosed herein may be produced by a speaker or other audio output device. In some embodiments, the audio device may be coupled directly to the system or processor generating the sound. In other embodiments, the audio device may be coupled indirectly to the system or processor such as via a network. Examples of such networks include the Internet, mobile telecommunications networks, a WIFI network, as well as any other wired and/or wireless networking system. When the audio device is indirectly coupled, the sound generated by the system or processor may be streamed over the network to the display device. Such streaming allows applications and other software which include audio to be executed on a server or in a data center and the generated sound to be transmitted and produced by one or more user devices (such as a computer, smartwatch, smartphone, other mobile device, etc.) that are physically separate from the server or data center. Hence, the techniques disclosed herein can be applied to enhance the sounds that are streamed and to enhance services that provide audio.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, smart watches, smart glasses, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present embodiments may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct embodiment as defined by the claims. Any feature or element of any embodiment may also be combined with features or elements from other embodiments to form another distinct embodiment as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

We claim:

1. A computer-implemented method comprising:
   receiving an encoded video file representing original video content and a transcript associated with the original video content;
   storing the encoded video file in place of an original video file containing original video content;
   processing the transcript using one or more machine learning models to identify a plurality of topics discussed in the transcript;
   causing a presentation, via a user interface, of a list of topics corresponding to the plurality of topics;
   receiving, via the user interface, a selection of a topic from the list of topics;
   responsive to the selection, selecting a sequence of one or more portions of the encoded video file that are associated with the topic;
   generating, based on the sequence, synthesized video data that simulates at least a portion of the original video content; and
   causing presentation of the synthesized video data.

2. The method of claim 1, wherein the one or more machine learning models further processes the original video content to identify the plurality of topics;
   where the plurality of topics includes at least one of a primary topic or secondary topic;
   and wherein the synthesized video data includes a high-resolution photorealistic video.

3. The method of claim 1, wherein the one or more machine learning models is at least one of a text analysis model, a text analytics model, a topic analysis model, an emotional speech recognition model, an emotional video recognition model, or a large language model (LLM).

4. The method of claim 3, wherein the one or more machine learning model is the LLM, and the method further comprises:
   using the LLM to apply critical reasoning to select clips from a video that lead to a decision.

5. The method of claim 1, wherein the sequence corresponds to at least a first portion and a second portion of the encoded video file, and wherein the first portion and the second portion were chronologically spaced apart in the encoded video file.

6. The method of claim 1, further comprising:
   receiving, via the user interface, a second selection of a second topic from the list of topics;
   responsive to the second selection, selecting a second sequence of one or more portions of the encoded video file that are associated with the second topic;
   generating, based on the second sequence, second synthesized video data; and
   causing presentation of the second synthesized video data.

7. The method of claim 6, wherein the sequence corresponds to at least a first portion and a second portion of the encoded video file, and the synthesized video data includes a first synthesized video segment corresponding to the first portion and a second synthesized video segment corresponding to the second portion, and causing the presentation of a storyboard-based user navigation interface in which the first synthesized video segment is a first chapter and the second synthesized video segment is a second chapter.

8. The method of claim 7, wherein the storyboard-based user navigation interface includes a plurality of selectable options, and the first chapter is represented by a first selectable image, and the second chapter is represented by a different, second selectable image.

9. The method of claim 8, wherein the first selectable image corresponds to an initial frame of the first synthesized video segment and the second selectable image corresponds to an initial frame of the second synthesized video segment and further comprising:
   receiving, via the user interface, a selection of the second selectable image; and
   causing presentation of the second synthesized video segment.

10. The method of claim 1, wherein the encoded video file is an encoded behavior file including a sequence of codes to represent poses of participants detected during the original video content.

11. A method comprising:
    detecting and classifying poses of participants from original video content;
    storing an encoded behavior file in place of an original video file containing original video content;
    wherein the encoded behavior file includes a sequence of codes to represent poses of participants detected during the original video content;
    receiving, via a user interface, a selection of a first behavior that corresponds to a first code; and
    causing presentation of a first playback session presenting second video content that includes those portions of the original video content associated with the first code.

12. The method of claim 11, further comprising generating a first list of behaviors based on the sequence of codes, each behavior in the first list being a selectable option, and wherein the first list is presented via the user interface;
    and wherein the poses are dynamic hand gestures.

13. The method of claim 11, further comprising:
    responsive to the selection of the first behavior, locating all instances of the first code that occur in the encoded behavior file; and
    presenting, via a video navigation system and at a first computing device, a navigation user interface with a plurality of selectable bookmarks, where a first instance of the first code in the encoded behavior file is represented by a first bookmark and a second instance of the first code in the encoded behavior file is represented by a second bookmark.

14. The method of claim 13, further comprising:
    receiving, via the user interface, a selection of the second bookmark; and
    causing playback of the second video content corresponding to the second bookmark.

15. A system comprising one or more processing units to perform operations comprising:
    receiving an encoded video file representing original video content and a transcript associated with the original video content;
    storing the encoded video file in place of an original video file containing original video content;
    processing the transcript using one or more machine learning models to identify a plurality of topics discussed in the transcript;

causing a presentation, via a user interface, of a list of topics corresponding to the plurality of topics;

receiving, via the user interface, a selection of a topic from the list of topics;

responsive to the selection, selecting a sequence of one or more portions of the encoded video file that are associated with the topic;

generating, based on the sequence, synthesized video data that simulates at least a portion of the original video content; and causing presentation of the synthesized video data.

16. The system of claim 15, where the one or machine learning models further process the original video content to identify the plurality of topics; and wherein the synthesized video data includes a high-resolution photorealistic video.

17. The system of claim 15, wherein the sequence corresponds to at least a first portion and a second portion of the encoded video file, and the first portion and the second portion were chronologically spaced apart in the encoded video file.

18. The system of claim 15, wherein:

the system receives, via the user interface, a request to pad the synthesized video data;

generating a pad synthesized video data;

inserting the pad synthesized video data into the synthesized video data; and causing presentation of synthesized video data with pad synthesized video data.

19. The system of claim 15, wherein the sequence corresponds to at least a first portion of the encoded video file, and the synthesized video data includes a first synthesized video segment corresponding to the first portion, and causing the processing units to pre-load a first sub-segment of the first synthesized video segment that is less than an entirety of the first synthesized video segment.

20. The system of claim 15, wherein the system causes the presentation of a storyboard-based user navigation interface corresponding to the plurality of topics.

* * * * *